United States Patent
Kobie et al.

(10) Patent No.: US 12,516,108 B2
(45) Date of Patent: Jan. 6, 2026

(54) MONOCLONAL ANTIBODIES AGAINST THE HEMAGGLUTININ (HA) AND NEURAMINIDASE (NA) OF IN-FLUENZA H3N2 VIRUSES

(71) Applicant: University of Rochester, Rochester, NY (US)

(72) Inventors: James J. Kobie, Rochester, NY (US); Luis Martinez-Sobrido, Rochester, NY (US); Michael Piepenbrink, Rochester, NY (US); Aitor Nogales, Rochester, NY (US)

(73) Assignee: University of Rochester, Rochester, NY (US)

( * ) Notice: Subject to any disclaimer, the term of this patent is extended or adjusted under 35 U.S.C. 154(b) by 776 days.

(21) Appl. No.: 17/907,126

(22) PCT Filed: Mar. 25, 2021

(86) PCT No.: PCT/US2021/024141
§ 371 (c)(1),
(2) Date: Sep. 23, 2022

(87) PCT Pub. No.: WO2021/202235
PCT Pub. Date: Oct. 7, 2021

(65) Prior Publication Data
US 2023/0107644 A1    Apr. 6, 2023

Related U.S. Application Data

(60) Provisional application No. 63/003,471, filed on Apr. 1, 2020.

(51) Int. Cl.
*C07K 16/10* (2006.01)
*A61K 39/00* (2006.01)
*A61P 31/16* (2006.01)

(52) U.S. Cl.
CPC .......... *C07K 16/1018* (2013.01); *A61P 31/16* (2018.01); *A61K 2039/505* (2013.01); *C07K 2317/14* (2013.01); *C07K 2317/21* (2013.01); *C07K 2317/24* (2013.01); *C07K 2317/52* (2013.01); *C07K 2317/565* (2013.01); *C07K 2317/76* (2013.01)

(58) Field of Classification Search
CPC ............................ C07K 16/1018; A61P 31/16
See application file for complete search history.

(56) References Cited

FOREIGN PATENT DOCUMENTS

| WO | 2019147867 A1 | 8/2019 |
|---|---|---|
| WO | 2019213384 A1 | 11/2019 |

OTHER PUBLICATIONS

Davide, C. et al., "Tackling influenza with broadly neutralizing antibodies," Current Opinion in Virology (2017); 24: pp. 60-69.
Database Medline [Online] US National Library of Medicine (NLM), Bethesda, MD, US; Mar. 1, 2020 (Mar. 1, 2020), Gao Rongyuan et al.: "Influenza A Virus Antibodies with Antibody-Dependent Cellular Cytotoxicity Function.", XP093330401, Database accession No. NLM32121563; & Gao Rongyuan et al.: "Influenza A Virus Antibodies with Antibody-Dependent Cellular Cytotoxicity Function.", Viruses Mar. 1, 2020, vol. 12, No. 3, Mar. 1, 2020 (Mar. 1, 2020), ISSN: 1999-4915.
European Office Action issued on Nov. 5, 2025 for European Patent Application No. 21720331.4 (7 pages).

*Primary Examiner* — Meera Natarajan
*Assistant Examiner* — Francesca Edgingtongiordano
(74) *Attorney, Agent, or Firm* — Fox Rothschild LLP

(57) ABSTRACT

The present disclosure relates to neutralizing anti-influenza monoclonal antibodies. The disclosure further relates to therapeutic uses of the isolated antibody. The antibodies are either directed against Hemagglutinin (HA) and Neuraminidase (NA) of Influenza H3N2.

21 Claims, 6 Drawing Sheets
Specification includes a Sequence Listing.

FIG. 2

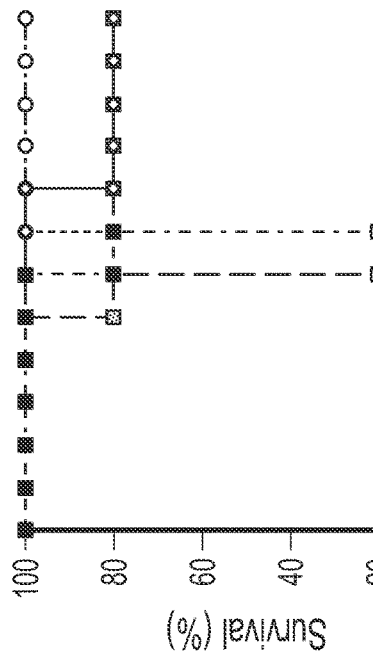
FIG. 3A
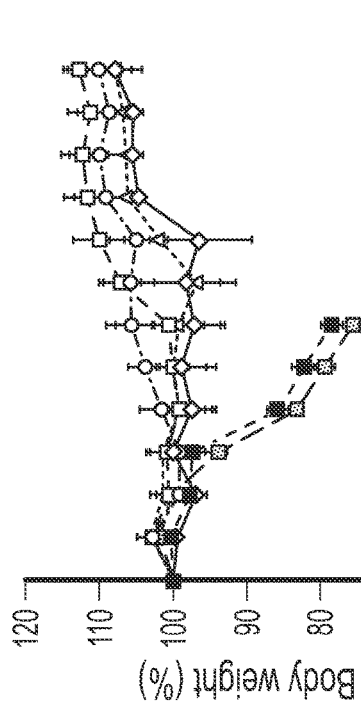
FIG. 3C
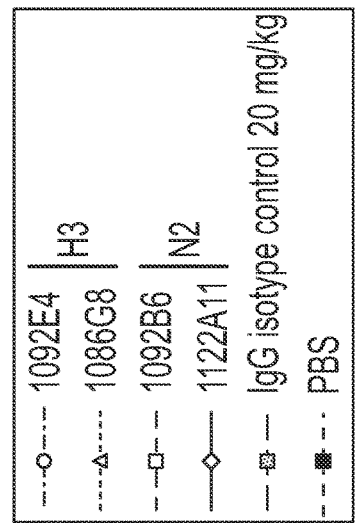
FIG. 3B
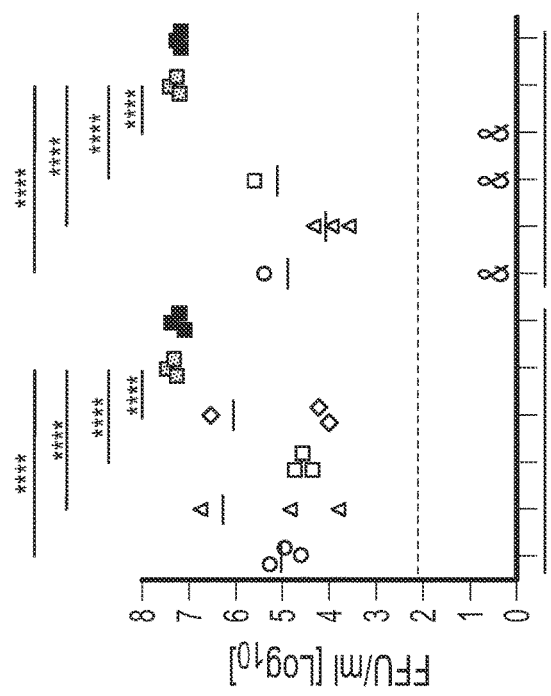

MONOCLONAL ANTIBODIES AGAINST THE HEMAGGLUTININ (HA) AND NEURAMINIDASE (NA) OF IN-FLUENZA H3N2 VIRUSES

CROSS REFERENCE TO RELATED APPLICATIONS

This application is the U.S. national phase of International Patent Application No. PCT/US21/24141, filed on Mar. 25, 2021, which claims priority to U.S. Provisional Application No. U.S. 63/003,471 filed on Apr. 1, 2020. The contents of the applications are incorporated herein by reference in their entirety.

GOVERNMENT INTERESTS

This invention was made with government support under AI116285 and AI145332 awarded by National Institutes of Health. The government has certain rights in the invention.

FIELD OF THE INVENTION

This invention relates to broadly neutralizing anti-influenza HA or NA monoclonal antibodies (mAbs) or antigen-binding fragments thereof. The present invention further relates to the therapeutic uses of the antibodies or the antigen-binding fragments.

BACKGROUND OF THE INVENTION

Influenza, commonly known as "the flu", is an infectious disease caused by influenza virus. There are four types of influenza viruses: A, B, C and D. Human influenza A and B viruses cause seasonal epidemics of the disease. The first and most important step in preventing flu is to get an annual flu vaccination. Although a licensed influenza vaccine has been available for over seventy years, influenza infections still remain a major public health concern. Annually, in the US influenza leads to about 30,000 deaths and about 200,000 hospitalizations, with about 3 to 5 million severe cases and 200,000 to 500,000 deaths per year globally. A key vulnerability is the need for annual selection of seasonal influenza vaccine composition to adequately match strains expected to be most prominent during the upcoming season. If the seasonal vaccine does not match the circulating strain the vaccine may be ineffective. Due to the propensity of influenza for antigenic drift and shift, and its tendency to elicit predominantly strain specific antibodies, humanity remains susceptible to waves of new strains with pandemic potential for which limited or no immunity may exist, as was the case in 1918 when the "Spanish Flu" killed ~30-50 million people. Although seasonal vaccinations include influenza type A H1, H3, and influenza type B strains, recent pandemics, including the latest 2009 novel H1N1 pandemic, demonstrate the need to develop new vaccine strategies and therapeutics that confer broad protection against diverse influenza strains.

SUMMARY OF INVENTION

This invention addresses the need by providing broadly neutralizing anti-influenza HA or NA monoclonal antibodies or antigen-binding fragments thereof.

In one aspect, the invention provides an isolated antibody or antigen-binding fragment thereof that specifically binds to a hemagglutinin (HA) of influenza virus, comprising: (i) a heavy chain variable region that comprises HCDR1, HCDR2, and HCDR3 comprising the respective sequences of a HCDR set selected from the group consisting of SEQ ID NOs: 1-3, SEQ ID NOs: 7-9, and SEQ ID NOs: 7, 8, and 12, and (ii) a light chain variable region that comprises LCDR1, LCDR2 and LCDR3 comprising the respective sequences of a LCDR set selected from the group consisting of SEQ ID NOs: 4-6 and SEQ ID NOs: 10, 5, and 11. In some embodiments, the heavy chain variable region comprises a sequence selected from the group consisting of SEQ ID NOs: 26, 30 and 34, and the light chain variable region comprises a sequence selected from the group consisting of SEQ ID NOs: 28, 32, and 36. In one example, the heavy chain variable region comprises the sequences of SEQ ID NOs: 1-3, and the light chain variable region comprises the sequences of SEQ ID NOs: 4-6. In another example, the heavy chain variable region comprises the sequences of SEQ ID NOs: 7, 8, and 9, and the light chain variable region comprises the sequences of SEQ ID NOs: 10, 5, and 11. In a further example, the heavy chain variable region comprises the sequences of SEQ ID NOs: 7, 8, and 12, and the light chain variable region comprises the sequences of SEQ ID NOs: 10, 5, and 11.

In another aspect, the invention provides an isolated antibody or antigen-binding fragment thereof that specifically binds to a neuraminidase (NA) of influenza virus, comprising: (i) a heavy chain variable region that comprises HCDR1, HCDR2, and HCDR3 comprising the respective sequences of a HCDR set selected from the group consisting of SEQ ID NOs: 13-15 and SEQ ID NOs: 19-21, and (ii) a light chain variable region that comprises LCDR1, LCDR2 and LCDR3 comprising the respective sequences of a LCDR set selected from the group consisting of SEQ ID NOs: 16-18, and SEQ ID NOs: 22-24. In some embodiments, the heavy chain variable region comprises a sequence selected from the group consisting of SEQ ID NOs: 38 and 42, and the light chain variable region comprises a sequence selected from the group consisting of SEQ ID NOs: 40 and 44. In one example, the heavy chain variable region comprises the sequences of SEQ ID NOs: 13-15, and the light chain variable region comprises the sequences of SEQ ID NOs: 16-18. In another example, the heavy chain variable region comprises the sequences of SEQ ID NOs: 19-21, and the light chain variable region comprises the sequences of SEQ ID NOs: 22-24.

Further provided is an isolated antibody or the antigen-binding fragment thereof that competes for binding to a HA or NA of influenza virus in a cross-blocking assay with one or more of the antibodies or antigen-binding fragments described above.

Each of the above-described antibodies or antigen-binding fragments can include a variant Fc constant region. The antibody or the antigen-binding fragment can be a chimeric antibody, a humanized antibody, or a human antibody. The antibody or fragment can be conjugated to a therapeutic agent, a polymer, a detectable label, or an enzyme. Examples of the polymer include polyethylene glycol (PEG). Examples of the therapeutic agent include a cytotoxic agent.

In another aspect, the invention provides an isolated nucleic acid or a set of nucleic acids encoding one or more of the CDRs, the heavy or light chain variable region, or antigen-binding portion, of any one of above-described antibodies or antigen-binding fragments. The nucleic acid or nucleic acids can be used to express a polypeptide having one or more sets of the HCDRs or LCDRS, a chain of the antibody or antigen-binding fragment, or the antibody or fragment described above. For this purpose, one can operatively link the nucleic acid or nucleic acids to suitable regulatory sequences to generate an expression vector. Accordingly, within the scope of this invention are a cultured host cell comprising the vector and a method for producing a polypeptide, an antibody, or antigen-binding portion thereof. The method includes: obtaining a cultured host cell comprising a vector comprising a nucleic acid or nucleic acids encoding one or more of the above mentioned CDRs, polypeptide, a heavy chain variable region or a light chain variable region of the antibody or antigen binding portion thereof as described above; culturing the cell in a medium under conditions permitting expression of a polypeptide encoded by the vector and assembling of an antibody or fragment thereof, and purifying the antibody or fragment from the cultured cell or the medium of the cell.

The antibody or fragment described above can be used in a method of neutralizing influenza virus or a method of treating, preventing or controlling an influenza virus infection. The method includes administering to a subject in need thereof a therapeutically effective amount of the antibody or fragment. The method can further comprise administering to the subject a therapeutically effective amount of a second antibody or an antigen-binding fragment thereof. Accordingly, the invention also provides a pharmaceutical composition comprising (i) one or more of the antibodies or antigen-binding fragments thereof, and (ii) a pharmaceutically acceptable carrier.

The details of one or more embodiments of the invention are set forth in the description below. Other features, objectives, and advantages of the invention will be apparent from the description and from the claims.

BRIEF DESCRIPTION OF THE DRAWINGS

FIG. 2 is a set of photographs showing binding profile of hmAbs to H3N2 influenza infected cells. MDCK cells were mock infected with the indicated viruses and 17 h later were fixed and stained with the indicated hMAbs and binding evaluated by immunofluorescence assay. A nucleoprotein (NP) mAb is an internal control to confirm infection.

FIGS. 3A, 3B, and 3C are diagrams showing that H3 and N2 hmAbs protect mice from H3N2 influenza infection. Female 5-to-7-week-old mice were treated i.p. with 20 mg/kg indicated H3 and N2 hmAbs, or with Isotype control (IgG) or PBS at 24 hours pre-infection. Mice were then challenged with 10 MLD50 of H3N2 X31 virus and monitored daily for body weight loss (A) and survival (B). Mice that lost 25% of their body weight were sacrificed. Data represent the means+/−SDs (n=5). To evaluate viral lung replication (C), mice were sacrificed at 2 (n=3) and 4 (n=3) days post-infection and whole lungs were harvested, and viral titers determined by immunofocus assay (FFU/ml). Symbols represent data from individual mice. Bars, geometric mean lung virus titers; dotted line, limit of detection (200 FFU/ml). Virus was detected only in 1 of 3 mice. *, p<0.05 using a Student's t test.

DETAILED DESCRIPTION OF THE INVENTION

Figure 1A:
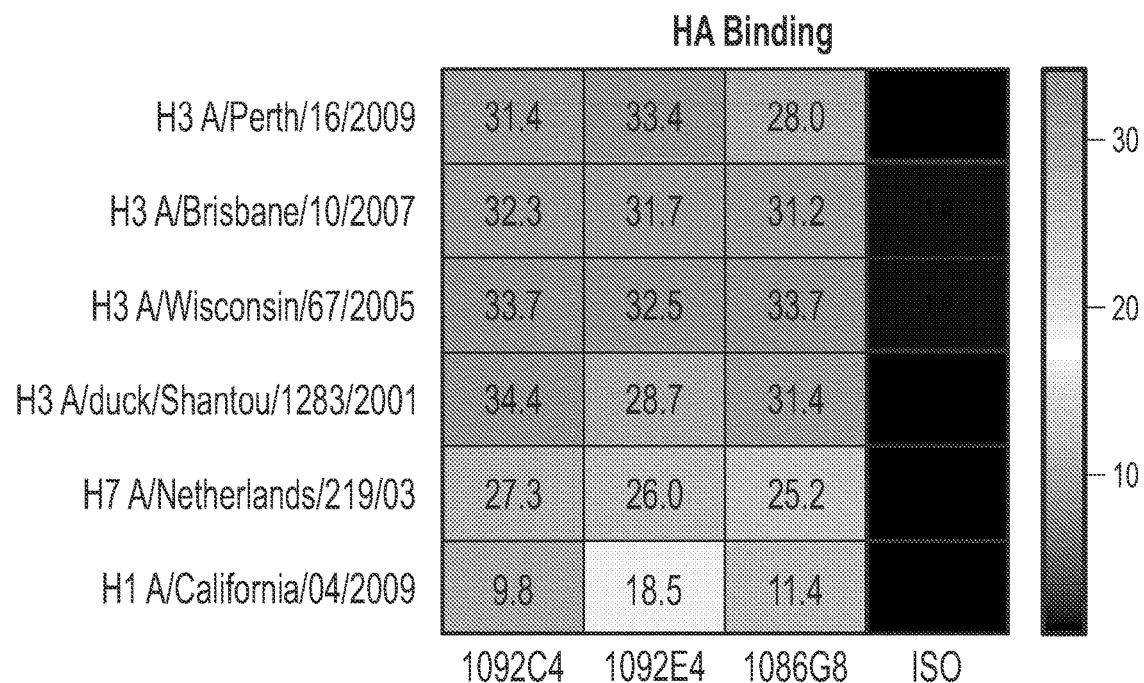
FIGS. 1A and 1B are a set of diagrams showing binding profile of H3 and N2 anti-influenza hmAbs. hmAbs were tested in triplicate at dilutions (10-0.01 µg/ml) for binding to influenza HA protein (1A) and NA protein (1B) (a negative control) by ELISA and area under curve (AUC) values presented. An isotype control hmAb (ISO) was included as a negative control.

This invention is based, at least in part, on unexpected broadly neutralizing anti-influenza activities of certain monoclonal antibodies or antigen-binding fragments thereof. These antibodies and antigen-binding fragments constitute a novel therapeutic strategy in protection from influenza infections.

The current anti-viral treatments (e.g., oseltamivir/Tamiflu, amantadine/rimantadine) for influenza are sub-optimal with increasing incidence of resistance and a limited therapeutic window (must start<48 hours after symptom onset). Subsequently new preventive and therapeutic interventions for influenza are being sought. Monoclonal antibodies (mAbs) continue to be a growing class of drugs in part due to their high degree of specificity, limited off-target effects, and superb safety profile. In addition to their use in treatment of cancer and autoimmunity, several mAbs are already licensed or in clinical trials for the treatment and prevention of various infectious diseases.

Only a few human monoclonal antibodies (hmAbs) have been isolated that have the ability to neutralize diverse influenza strains. These all target the hemagglutinin (HA) protein expressed on the surface of the virion and include hmAbs such as 1F1 (PMC3516549) and CH65 (PMC3161572), which bind multiple H1 isolates, those hmAbs such as F10 (PMC2692245) and CR6261 (PMC2758658), which recognize all group 1 viruses, hmAbs 3114 (PMC5027281), F16/MEDI8852 (PMID: 21798894, PMC4967455), and VS140 (PMC4568252), which each recognize both group 1 (e.g., H1, H2, H5) and group 2 (e.g., H3, H7) viruses, or CR9114 (PMC3538841) which recognizes both type A and type B viruses. Several of these hmAbs are currently in clinical trials and additionally their characterization has led to the identification of conserved epitopes in influenza HA that might be valuable to target for the development of universal influenza vaccines and therapeutics.

Broadly antiviral hMAbs represent an excellent option for effective immunotherapeutics to prevent and treat influenza virus infection for which vaccine-induced immunity has not yet been achieved (representing lack of a vaccine [e.g., pandemic], a suboptimal vaccine, and/or an unvaccinated population) or where existing antiviral drugs are of limited efficacy. See, e.g., WO 2018/213097, WO 2019/213384, Park J G et al. A Broad and Potent H1-Specific Human Monoclonal Antibody Produced in Plants Prevents Influenza Virus Infection and Transmission in Guinea Pigs. Viruses. 2020 Feb. 2; 12(2), Piepenbrink M S et al. Broad and Protective Influenza B Virus Neuraminidase Antibodies in Humans after Vaccination and their Clonal Persistence as Plasma Cells. MBio. 2019 Mar. 12; 10(2), and Nogales A et al. A highly potent and broadly neutralizing H1 influenz-specific human monoclonal antibody. Sci Rep. 2018 Mar. 12; 8(1):4374. The contents of these documents are incorporated by references. A few HA-specific hMAbs have been isolated that have antiviral activity against diverse influenza strains and are in clinical trials for the treatment of hospitalized patients and noncomplicated infections, highlighting the clinical feasibility and potential of influenza-specific hMAbs.

The broadly neutralizing anti-influenza human monoclonal antibodies or fragments described above can be used for treating, preventing, or controlling an influenza virus infection. The antibodies or fragments could be administered prophylactically to subjects at high risk for influenza infection to potentially prevent the development of influenza infection. The antibodies or fragments could be administered to subjects during influenza infection to decrease severity and duration of infection thereby treating the infection.

The antibodies or fragments can also be used for prevention and treatment of pandemic influenza infection. Because of the broad reactivity of the Abs they may be uniquely suited for use against pandemic influenza strains, for which seasonal influenza vaccine may be ineffective or pre-existing immunity may be limited. As disclosed herein, alternative formats of the Abs can be used. The Abs may be used as whole human IgG proteins, subunits thereof, or Abs conjugated to a functional label. Within the scope of this invention is generation of vaccines or drugs based on the epitope recognized by the Abs. Immunogens or drugs targeting the conserved epitopes recognized by the hmAbs may confer universal protection from influenza virus infection. Also within the scope of this invention is combinatory treatment using one or more of the Abs disclosed herein with other antivirals/Abs for the prevention and/or treatment of influenza infection.

Antibodies

The invention disclosed herein involves broadly neutralizing anti-influenza monoclonal antibodies or antigen-binding fragments thereof. These antibodies refer to a class of neutralizing antibodies that neutralize multiple influenza virus strains. The antibodies are able to protect prophylactically and therapeutically a subject (e.g., a mouse as shown in the examples below) against a lethal challenge with an influenza virus, such as those listed in Table 2 below.

Listed below are amino acid sequences of the heavy chain CDR1-3 (HCDR1, HCDR2, and HCDR3), light chain CDR1-3 (LCDR1, LCDR2, and LCDR3), heavy chain (HC) variable regions, and light chain (LC) variable regions of several exemplary antibodies. Also listed are the corresponding nucleic acid sequences.

| mAb | HCDR1 | HCDR2 | HCDR3 | LCDR1 | LCDR2 | LCDR3 |
|---|---|---|---|---|---|---|
| 1086G8 | GFTFAISGNG SDA | GIT | AKGVAPSHFNQSVRH LLTGYYAGHYN YFDF | GAS | | QQYNH WPPYT |
| SEQ ID No: | 1 | 2 | 3 | 4 | 5 | 6 |
| 1092C4 | GYSFTISAYT RYG | GNT | ARDLPQGVVIQSVTS LGSYYYGMDVRY | GAS | | QQSGS PRT |
| SEQ ID No: | 7 | 8 | 9 | 10 | 5 | 11 |
| 1092E4 | GYSFTISAYT RYG | GNT | ARDHPQGVVIQSVTS LGSYYYGMDVRY | GAS | | QQSGS PRT |
| SEQ ID No: | 7 | 8 | 12 | 10 | 5 | 11 |
| 1122A11 | GYSFTINPSG SQS | GIT | VRDLSHYNEVKLGKK GHDRAYYYGMY DI | QDN | | QAWDS SAVV |
| SEQ ID No: | 13 | 14 | 15 | 16 | 17 | 18 |
| 1122B9 | GFTFSIIGSG GYA | GST | AKHTKSHYYSQDISN GMGV | DAA | Y | QQYDN LPLT |
| SEQ ID No: | 19 | 20 | 21 | 22 | 23 | 24 |

1086G8-heavy
(SEQ ID No: 25)
gaggtgcagctgttggagtctgggggaggcttggttcagcctgggggggtc cctgagactctcctgtacagcctctggattcacgtttgccagcgatgcca tgaactgggtccgccaggctccagggaagggcctggagtgggtctcagct attagtggtaatggtggtatcacatacttcgcagactccgtgaagggccg gttcaccatctcccgagacaattccaaggacacgctctatctgcaaatgg acagcctgagggccgaggacacggccgtatattactgtgcaaaagggtc gcaccctcacatttcaatcttttgactggttattatgcgggacactacta cttttgacttctggggccagggaaccctggtcaccgtctcctcag /translation
(SEQ ID No: 26)
EVQLLESGGGLVQPGGSLRLSCTASGFTFASDAMNWVRQAPGKGLEWVSA

ISGNGGITYFADSVKGRFTISRDNSKDTLYLQMDSLRAEDTAVYYCAKGV

APSHFNLLTGYYAGHYYFDFWGQGTLVTVSS

1086G8-kappa
(SEQ ID No: 27)
gaaatagtgatgacgcagtctccagccaccctgtctgtgtctccaggggg aaagagccaccctctcctgcagggccagtcagagtgttcgtcacaacttt agcctggtaccagcacaaacctggccagcctcccaggctcctcatctat ggtgcatccactagggccgctagtgtcccagccaggttcagtggcagtg ggtctgggacagacttcactctcaccatcagcagcctgcagtctgaaga ttttgcagtttattactgtcagcagtataatcactggcctccgtacact tttggccaggggaccaagctggagatcaaac /translation
(SEQ ID No: 28)
EIVMTQSPATLSVSPGERATLSCRASQSVRHNLAWYQHKPGQPPRLLIYG

ASTRAASVPARFSGSGSGTDFTLTISSLQSEDFAVYYCQQYNHWPPYTFG

QGTKLEIK

1092C4-heavy
(SEQ ID No: 29)
gaggtgcagctggtgcagtctggggctgaggtgaagaagcctggggcctc agtgaaggtctcctgcaaggcctctggttacagttttaccagatatggta ttagctgggtgcgacaggcccctggacaaggccttgagtggatgggatgg atcagcgcttacactggtaacacagactatgcacagaagtttcagggcag aatcaccatgaccacagacacatccacgagcacagcctacatggagctga ggagcctgagatctgacgacacggccgtttattactgtgcgagagatctc cctcagggagtagttatattaggctcctattactacggtatggacgtctg gggccaagggaacacggtcaccgtctcctca /translation (SEQ ID No: 30)
EVQLVQSGAEVKKPGASVKVSCKASGYSFTRYGISWVRQAPGQGLEWMGW
ISAYTGNTDYAQKFQGRITMTTDTSTSTAYMELRSLRSDDTAVYYCARDL
PQGVVILGSYYYGMDVWGQGNTVTVSS 1092C4-kappa (SEQ ID No: 31)
gaaattgtgttgacgcagtctccaggcaccctgtctttgtctccagggga
aagagccaccctctcctgcagggccagtcagagtgttaccagtaggtact
tagcctggtaccagcaaaaacttggccaggctcccaggctcctcatctat
ggtgcatccagcagggccactggcatcccagacaggttcagtggcagtgg
gtctgggacagacttcactctcaccatcagcagtctggagcctgaagatc
ttgcagtttattactgtcagcagtctggtagcccacggacgttcggccaa
gggaccaaggtggaaatcaaac /translation (SEQ ID No: 32)
EIVLTQSPGTLSLSPGERATLSCRASQSVTSRYLAWYQQKLGQAPRLLIY
GASSRATGIPDRFSGSGSGTDFTLTISSLEPEDLAVYYCQQSGSPRTFGQ
GTKVEIK 1092E4-heavy (SEQ ID No: 33)
caggtgcagctggtgcagtctggagctgaggtgaagaagcctggggcctc
agtgaaggtctcctgcaaggcctctggttacagctttaccagatatggta
taagctgggtgcgacaggcccctggacaaggccttgagtggatgggatgg
atcagcgcttacactggtaacacagactatgcacagaaatttcagggcag
aatcaccatgaccacagacacatccacgagcacagtctacatggagctga
ggagcctaagatctgacgacacggccgtgtattactgtgcgagagatcac
cctcagggagtagttatattaggctcctattactacggtatggacgtctg
gggccaagggaacacggtcaccgtctcctca /translation (SEQ ID No: 34)
QVQLVQSGAEVKKPGASVKVSCKASGYSFTRYGISWVRQAPGQGLEWMGW
ISAYTGNTDYAQKFQGRITMTTDTSTSTVYMELRSLRSDDTAVYYCARDH
PQGVVILGSYYYGMDVWGQGNTVTVSS 1092E4-kappa (SEQ ID No: 35)
gaaattgtgttgacgcagtctccgggcaccctgtctttgtctccagggga
aagagccaccctctcctgcagggccagtcagagtgttaccagtaggtact
tagcctggtaccagcaaaaacttggccaggctcccaggctcctcatctat
ggtgcatccagcagggccactggcatcccagacaggttcagtggcagtgg
gtctgggacagacttcactctcaccatcagcagtctggagcctgaagatt
ttgcagtgtattactgtcagcagtctggtagcccacggacgttcggccaa
gggaccaaggtggaaatcaaac /translation (SEQ ID No: 36)
EIVLTQSPGTLSLSPGERATLSCRASQSVTSRYLAWYQQKLGQAPRLLIY
GASSRATGIPDRFSGSGSGTDFTLTISSLEPEDFAVYYCQQSGSPRTFGQ
GTKVEIK 1122A11-heavy (SEQ ID No: 37)
caggtgcagctggtgcagtctggggctgaggtgagcaagcctggggcctc
agtgaaggtctcct
gcaaggcatctggatacagcttcaccagccagtctctaggctgggtgcgg
caggcccctggacaagggcttgagtggatgggaataatcaaccctagtgg
tggtatcacaaactacgcacacaagttccagggcagagtcaccatgacca
gggacacgtccacgagcacggtctacatggagctgagcagcctgagatct
gaggacacggccctgtattactgtgtgagagatttgagtcattacaatga
agtgggacatgacagggcctactactacggtatggacatctggggccaag
ggaccacggtcaccgtctcctca /translation (SEQ ID No: 38)
QVQLVQSGAEVSKPGASVKVSCKASGYSFTSQSLGWVRQAPGQGLEWMGI
INPSGGITNYAHKFQGRVTMTRDTSTSTVYMELSSLRSEDTALYYCVRDL
SHYNEVGHDRAYYYGMDIWGQGTTVTVSS 1122A11-lambda (SEQ ID No: 39)
tcctatgagctgattcagccaccctcagtgtccgtgtccccaggacagac
agccagcatcacct
gttctggagataaattggggaaaaaatatacttgctggtatcagcagaag
ccaggccagtcccctgtgctggtcatctatcaggataacaagcggccctc
agggatccctgagcggttctctggctccaactctgggaacacagccactc
tgaccatcagcgggacccaggctatggatgaggctgactattactgtcag
gcgtgggacagcagcgctgtggtattcggcggagggaccaagctgaccgt
cctgg /translation (SEQ ID No: 40)
SYELIQPPSVSVSPGQTASITCSGDKLGKKYTCWYQQKPGQSPVLIYQD
NKRPSGIPERFSGSNSGNTATLTISGTQAMDEADYYCQAWDSSAVVFGGG
TKLTVL 1122B9-heavy (SEQ ID No: 41)
gaggtgcagctggtggagtctgggggaggcttggtccagccggggggtc
cctgagactctcc
tgtgcagcctctggattcacctttagcggctatgccatgagctgggtccg
ccaggctccagggaaggggctggagtgcgtctcaggtattattggtagtg
gtggaagcacatactccgcagactccgtgaagggccggttcaccatctcc
agagacaattccaagaacacgctggatctggaaatgaacagcctgagagc
cgaggacacggccgtatattattgtgcgaaacataccaaatcccactact
attccggaatgggcgtctggggccaagggaccacggtcaccgtctcctca -continued /translation
(SEQ ID No: 42)
EVQLVESGGGLVQPGGSLRLSCAASGFTFSGYAMSWVRQAPGKGLECVSG

IIGSGGSTYSADSVKGRFTISRDNSKNTLDLEMNSLRAEDTAVYYCAKHT

KSHYYSGMGVWGQGTTVTVSS

1122B9-kappa
(SEQ ID No: 43)
gacatccagatgacccagtctccatcctccctgtctgcatctgtaggaga cagagtcaccatcacttgccaggcgagtcaggacattagcaactatttaa attggtatcagcagagaccagggaaagcccctaaactcctgatctacgat gcagccaatttggaaacaggggtcccatcaaggttcagcggaagtggatc tgcgacacagtttactttcaccatcagcggcctgcagcctgaagattttg caacatattactgtcaacagtatgataatctccctctcactttcggcggc gggaccaaggtggaaatcaaac /translation
(SEQ ID No: 44)
DIQMTQSPSSLSASVGDRVTITCQASQDISNYLNWYQQRPGKAPKLLIYD

AANLETGVPSRFSGSGSATQFTFTISGLQPEDFATYYCQQYDNLPLTFGG

GTKVEIK

Fragment

In certain embodiments, an antibody provided herein is an antibody fragment. Antibody fragments include, but are not limited to, Fab, Fab', Fab'-SH, F(ab')$_2$, Fv, and single-chain Fv (scFv) fragments, and other fragments described below, e.g., diabodies, triabodies tetrabodies, and single-domain antibodies. For a review of certain antibody fragments, see Hudson et al., Nat. Med. 9:129-134 (2003). For a review of scFv fragments, see, e.g., Pluckthun, in The Pharmacology of Monoclonal Antibodies, vol. 113, Rosenburg and Moore eds., (Springer-Verlag, New York), pp. 269-315 (1994); see also WO 93/16185; and U.S. Pat. Nos. 5,571,894 and 5,587,458. For discussion of Fab and F(ab')2 fragments comprising salvage receptor binding epitope residues and having increased in vivo half-life, see U.S. Pat. No. 5,869,046.

Diabodies are antibody fragments with two antigen-binding sites that may be bivalent or bispecific. See, for example, EP 404,097; WO 1993/01161; Hudson et al., Nat. Med. 9:129-134 (2003); and Hollinger et al., Proc. Natl. Acad. Sci. USA 90: 6444-6448 (1993). Triabodies and tetrabodies are also described in Hudson et al., Nat. Med. 9:129-134 (2003).

Single-domain antibodies are antibody fragments comprising all or a portion of the heavy chain variable domain or all or a portion of the light chain variable domain of an antibody. In certain embodiments, a single-domain antibody is a human single-domain antibody (DOMANTIS, Inc., Waltham, Mass.; see, e.g., U.S. Pat. No. 6,248,516).

Antibody fragments can be made by various techniques, including but not limited to proteolytic digestion of an intact antibody as well as production by recombinant host cells (e.g., E. coli or phage), as described herein.

Chimeric and Humanized Antibodies

In certain embodiments, an antibody provided herein is a chimeric antibody. Certain chimeric antibodies are described, e.g., in U.S. Pat. No. 4,816,567; and Morrison et al., Proc. Natl. Acad. Sci. USA, 81:6851-6855 (1984)). In one example, a chimeric antibody comprises a non-human variable region (e.g., a variable region derived from a mouse, rat, hamster, rabbit, or non-human primate, such as a monkey) and a human constant region. In another example, a chimeric antibody comprises a human variable region and a non-human constant region (e.g., a constant region derived from a mouse, rat, hamster, rabbit, or non-human primate, such as a monkey). In a further example, a chimeric antibody is a "class switched" antibody in which the class or subclass has been changed from that of the parent antibody. Chimeric antibodies include antigen-binding fragments thereof.

In certain embodiments, an antibody is a humanized antibody. Typically, a non-human antibody is humanized to reduce immunogenicity to humans, while retaining the specificity and affinity of the parental non-human antibody. Generally, a humanized antibody comprises one or more variable domains in which HVRs, e.g., CDRs, (or portions thereof) are derived from a non-human antibody, and FRs (or portions thereof) are derived from human antibody sequences. A humanized antibody optionally will also comprise at least a portion of a human constant region. In some embodiments, some FR residues in a humanized antibody are substituted with corresponding residues from a non-human antibody (e.g., the antibody from which the HVR residues are derived), e.g., to restore or improve antibody specificity or affinity.

Humanized antibodies and methods of making them are reviewed, e.g., in Almagro and Fransson, Front. Biosci. 13:1619-1633 (2008), and are further described, e.g., in Riechmann et al., Nature 332:323-329 (1988); Queen et al., Proc. Nat'l Acad. Sci. USA 86:10029-10033 (1989); U.S. Pat. Nos. 5,821,337, 7,527,791, 6,982,321, and 7,087,409; Kashmiri et al., Methods 36:25-34 (2005) (describing specificity determining region (SDR) grafting); Padlan, Mol. Immunol. 28:489-498 (1991) (describing "resurfacing"); Dall'Acqua et al., Methods 36:43-60 (2005) (describing "FR shuffling"); and Osbourn et al., Methods 36:61-68 (2005) and Klimka et al., Br. J. Cancer, 83:252-260 (2000) (describing the "guided selection" approach to FR shuffling).

Human framework regions that may be used for humanization include but are not limited to: framework regions selected using the "best-fit" method (see, e.g., Sims et al. J. Immunol. 151:2296 (1993)); framework regions derived from the consensus sequence of human antibodies of a particular subgroup of light or heavy chain variable regions (see, e.g., Carter et al. Proc. Natl. Acad. Sci. USA, 89:4285 (1992); and Presta et al. J. Immunol., 151:2623 (1993)); human mature (somatically mutated) framework regions or human germline framework regions (see, e.g., Almagro and Fransson, Front. Biosci. 13:1619-1633 (2008)); and framework regions derived from screening FR libraries (see, e.g., Baca et al., J. Biol. Chem. 272:10678-10684 (1997) and Rosok et al., J. Biol. Chem. 271:22611-22618 (1996)).

Human Antibodies

In certain embodiments, an antibody provided herein is a human antibody. Human antibodies can be produced using various techniques known in the art or using techniques described herein. Human antibodies are described generally in van Dijk and van de Winkel, Curr. Opin. Pharmacol. 5: 368-74 (2001) and Lonberg, Curr. Opin. Immunol. 20:450-459 (2008).

Human antibodies may be prepared by administering an immunogen to a transgenic animal that has been modified to produce intact human antibodies or intact antibodies with human variable regions in response to antigenic challenge. Such animals typically contain all or a portion of the human immunoglobulin loci, which replace the endogenous immunoglobulin loci, or which are present extrachromosomally or integrated randomly into the animal's chromosomes. In such transgenic mice, the endogenous immunoglobulin loci have generally been inactivated. For review of methods for obtaining human antibodies from transgenic animals, see Lonberg, Nat. Biotech. 23:1117-1125 (2005). See also, e.g., U.S. Pat. Nos. 6,075,181 and 6,150,584 describing XENO-MOUSE technology; U.S. Pat. No. 5,770,429 describing HUMAB technology; U.S. Pat. No. 7,041,870 describing K-M MOUSE technology, and U.S. Patent Application Publication No. US 2007/0061900, describing VELOCI-MOUSE technology). Human variable regions from intact antibodies generated by such animals may be further modified, e.g., by combining with a different human constant region.

Human antibodies can also be made by hybridoma-based methods. Human myeloma and mouse-human heteromyeloma cell lines for the production of human monoclonal antibodies have been described. (See, e.g., Kozbor J. Immunol., 133: 3001 (1984); Brodeur et al., Monoclonal Antibody Production Techniques and Applications, pp. 51-63 (Marcel Dekker, Inc., New York, 1987); and Boerner et al., J. Immunol., 147: 86 (1991).) Human antibodies generated via human B-cell hybridoma technology are also described in Li et al., Proc. Natl. Acad. Sci. USA, 103:3557-3562 (2006). Additional methods include those described, for example, in U.S. Pat. No. 7,189,826 (describing production of monoclonal human IgM antibodies from hybridoma cell lines) and Ni, Xiandai Mianyixue, 26(4):265-268 (2006) (describing human-human hybridomas). Human hybridoma technology (Trioma technology) is also described in Vollmers and Brandlein, Histology and Histopathology, 20(3):927-937 (2005) and Vollmers and Brandlein, Methods and Findings in Experimental and Clinical Pharmacology, 27(3):185-91 (2005).

Human antibodies may also be generated by isolating Fv clone variable domain sequences selected from human-derived phage display libraries. Such variable domain sequences may then be combined with a desired human constant domain. Techniques for selecting human antibodies from antibody libraries are described below.

Antibodies of the invention may be isolated by screening combinatorial libraries for antibodies with the desired activity or activities. For example, a variety of methods are known in the art for generating phage display libraries and screening such libraries for antibodies possessing the desired binding characteristics. Such methods are reviewed, e.g., in Hoogenboom et al., in Methods in Molecular Biology 178: 1-37 (O'Brien et al., ed., Human Press, Totowa, N.J., 2001) and further described, e.g., in the McCafferty et al., Nature 348:552-554; Clackson et al., Nature 352: 624-628 (1991); Marks et al., J. Mol. Biol. 222: 581-597 (1992); Marks and Bradbury, in Methods in Molecular Biology 248:161-175 (Lo, ed., Human Press, Totowa, N.J., 2003); Sidhu et al., J. Mol. Biol. 338(2): 299-310 (2004); Lee et al., J. Mol. Biol. 340(5): 1073-1093 (2004); Fellouse, Proc. Natl. Acad. Sci. USA 101(34): 12467-12472 (2004); and Lee et al., J. Immunol. Methods 284(1-2): 119-132 (2004).

In certain phage display methods, repertoires of VH and VL genes are separately cloned by polymerase chain reaction (PCR) and recombined randomly in phage libraries, which can then be screened for antigen-binding phage as described in Winter et al., Ann. Rev. Immunol., 12: 433-455 (1994). Phage typically display antibody fragments, either as scFv fragments or as Fab fragments. Libraries from immunized sources provide high-affinity antibodies to the immunogen without the requirement of constructing hybridomas. Alternatively, the naive repertoire can be cloned (e.g., from human) to provide a single source of antibodies to a wide range of non-self and also self-antigens without any immunization as described by Griffiths et al., EMBO J, 12: 725-734 (1993). Finally, naive libraries can also be made synthetically by cloning unrearranged V-gene segments from stem cells, and using PCR primers containing random sequence to encode the highly variable CDR3 regions and to accomplish rearrangement in vitro, as described by Hoogenboom and Winter, J. Mol. Biol., 227: 381-388 (1992). Patent publications describing human antibody phage libraries include, for example: U.S. Pat. No. 5,750,373, and US Patent Publication Nos. 2005/0079574, 2005/0119455, 2005/0266000, 2007/0117126, 2007/0160598, 2007/0237764, 2007/0292936, and 2009/0002360. Antibodies or antibody fragments isolated from human antibody libraries are considered human antibodies or human antibody fragments herein.

Variants

In certain embodiments, amino acid sequence variants of the antibodies provided herein are contemplated. For example, it may be desirable to improve the binding affinity and/or other biological properties of the antibody. Amino acid sequence variants of an antibody may be prepared by introducing appropriate modifications into the nucleotide sequence encoding the antibody, or by peptide synthesis. Such modifications include, for example, deletions from, and/or insertions into and/or substitutions of residues within the amino acid sequences of the antibody. Any combination of deletion, insertion, and substitution can be made to arrive at the final construct, provided that the final construct possesses the desired characteristics, e.g., antigen binding.

Substitution, Insertion, and Deletion Variants

In certain embodiments, antibody variants having one or more amino acid substitutions are provided. Sites of interest for substitutional mutagenesis include the HVRs and FRs. Conservative substitutions are defined herein. Amino acid substitutions may be introduced into an antibody of interest and the products screened for a desired activity, e.g., retained/improved antigen binding, decreased immunogenicity, or improved ADCC or CDC.

Accordingly, an antibody of the invention can comprise one or more conservative modifications of the CDRs, heavy chain variable region, or light variable regions described herein. A conservative modification or functional equivalent of a peptide, polypeptide, or protein disclosed in this invention refers to a polypeptide derivative of the peptide, polypeptide, or protein, e.g., a protein having one or more point mutations, insertions, deletions, truncations, a fusion protein, or a combination thereof. It retains substantially the activity to of the parent peptide, polypeptide, or protein (such as those disclosed in this invention). In general, a conservative modification or functional equivalent is at least 60% (e.g., any number between 60% and 100%, inclusive, e.g., 60%, 70%, 75%, 80%, 85%, 90%, 95%, 96%, 97%, 98%, and 99%) identical to a parent (e.g., one of the amino acid sequences described above). Accordingly, within scope of this invention are heavy chain variable region or light variable regions having one or more point mutations, insertions, deletions, truncations, a fusion protein, or a combination thereof, as well as antibodies having the variant regions.

As used herein, the percent homology between two amino acid sequences is equivalent to the percent identity between the two sequences. The percent identity between the two sequences is a function of the number of identical positions shared by the sequences (i.e., % homology=# of identical positions/total # of positions×100), taking into account the number of gaps, and the length of each gap, which need to be introduced for optimal alignment of the two sequences. The comparison of sequences and determination of percent identity between two sequences can be accomplished using a mathematical algorithm, as described in the non-limiting examples below.

The percent identity between two amino acid sequences can be determined using the algorithm of E. Meyers and W. Miller (Comput. Appl. Biosci., 4:11-17 (1988)) which has been incorporated into the ALIGN program (version 2.0), using a PAM120 weight residue table, a gap length penalty of 12 and a gap penalty of 4. In addition, the percent identity between two amino acid sequences can be determined using the Needleman and Wunsch (J. Mol. Biol. 48:444-453 (1970)) algorithm which has been incorporated into the GAP program in the GCG software package (available at www.gcg.com), using either a Blossum 62 matrix or a PAM250 matrix, and a gap weight of 16, 14, 12, 10, 8, 6, or 4 and a length weight of 1, 2, 3, 4, 5, or 6.

Additionally or alternatively, the protein sequences of the present invention can further be used as a "query sequence" to perform a search against public databases to, for example, identify related sequences. Such searches can be performed using the XBLAST program (version 2.0) of Altschul, et al. (1990) J. Mol. Biol. 215:403-10. BLAST protein searches can be performed with the XBLAST program, score=50, wordlength=3 to obtain amino acid sequences homologous to the antibody molecules of the invention. To obtain gapped alignments for comparison purposes, Gapped BLAST can be utilized as described in Altschul et al., (1997) Nucleic Acids Res. 25(17):3389-3402. When utilizing BLAST and Gapped BLAST programs, the default parameters of the respective programs (e.g., XBLAST and NBLAST) can be used. (See www.ncbi.nlm.nih.gov).

As used herein, the term "conservative modifications" refers to amino acid modifications that do not significantly affect or alter the binding characteristics of the antibody containing the amino acid sequence. Such conservative modifications include amino acid substitutions, additions and deletions. Modifications can be introduced into an antibody of the invention by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include:
  amino acids with basic side chains (e.g., lysine, arginine, histidine),
  acidic side chains (e.g., aspartic acid, glutamic acid),
  uncharged polar side chains (e.g., glycine, asparagine, glutamine, serine, threonine, tyrosine, cysteine, tryptophan),
  nonpolar side chains (e.g., alanine, valine, leucine, isoleucine, proline, phenylalanine, methionine),
  beta-branched side chains (e.g., threonine, valine, isoleucine) and
  aromatic side chains (e.g., tyrosine, phenylalanine, tryptophan, histidine).

Non-conservative substitutions will entail exchanging a member of one of these classes for another class.

An exemplary substitutional variant is an affinity matured antibody, which may be conveniently generated, e.g., using phage display-based affinity maturation techniques such as those described in e.g., Hoogenboom et al., in Methods in Molecular Biology 178:1-37 (O'Brien et al., ed., Human Press, Totowa, N.J., (2001). Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g., for ADEPT) or a polypeptide which increases the serum half-life of the antibody.

Glycosylation Variants

In certain embodiments, an antibody provided herein is altered to increase or decrease the extent to which the antibody is glycosylated. Addition or deletion of glycosylation sites to an antibody may be conveniently accomplished by altering the amino acid sequence such that one or more glycosylation sites is created or removed.

For example, an aglycoslated antibody can be made (i.e., the antibody lacks glycosylation). Glycosylation can be altered to, for example, increase the affinity of the antibody for antigen. Such carbohydrate modifications can be accomplished by, for example, altering one or more sites of glycosylation within the antibody sequence. For example, one or more amino acid substitutions can be made that result in elimination of one or more variable region framework glycosylation sites to thereby eliminate glycosylation at that site. Such aglycosylation may increase the affinity of the antibody for antigen. Such an approach is described in further detail in U.S. Pat. Nos. 5,714,350 and 6,350,861 by Co et al.

Glycosylation of the constant region on N297 may be prevented by mutating the N297 residue to another residue, e.g., N297A, and/or by mutating an adjacent amino acid, e.g., 298 to thereby reduce glycosylation on N297.

Additionally or alternatively, an antibody can be made that has an altered type of glycosylation, such as a hypofucosylated antibody having reduced amounts of fucosyl residues or an antibody having increased bisecting GlcNac structures. Such altered glycosylation patterns have been demonstrated to increase the ADCC ability of antibodies. Such carbohydrate modifications can be accomplished by, for example, expressing the antibody in a host cell with altered glycosylation machinery. Cells with altered glycosylation machinery have been described in the art and can be used as host cells in which to express recombinant antibodies described herein to thereby produce an antibody with altered glycosylation. For example, EP 1,176,195 by Hanai et al. describes a cell line with a functionally disrupted FUT8 gene, which encodes a fucosyl transferase, such that antibodies expressed in such a cell line exhibit hypofucosylation. PCT Publication WO 03/035835 by Presta describes a variant Chinese Hamster Ovary cell line, Led 3 cells, with reduced ability to attach fucose to Asn(297)-linked carbohydrates, also resulting in hypofucosylation of antibodies expressed in that host cell (see also Shields, R. L. et al. (2002) J. Biol. Chem. 277:26733-26740). PCT Publication WO 99/54342 by Umana et al. describes cell lines engineered to express glycoprotein-modifying glycosyl transferases (e.g., beta(1,4)-N-acetylglucosaminyltransferase III (GnTIII)) such that antibodies expressed in the engineered cell lines exhibit increased bisecting GlcNac structures which results in increased ADCC activity of the antibodies (see also Umana et al. (1999) Nat. Biotech. 17: 176-180).

Fc Region Variants

The variable regions of the antibody described herein can be linked (e.g., covalently linked or fused) to an Fc, e.g., an IgG1, IgG2, IgG3 or IgG4 Fc, which may be of any allotype or isoallotype, e.g., for IgG1: G1m, G1m1(a), G1m2(x), G1m3(f), G1m17(z); for IgG2: G2m, G2m23(n); for IgG3:

G3m, G3m21(g1), G3m28(g5), G3m1 1(b0), G3m5(b1), G3m13(b3), G3m14(b4), G3m10(b5), G3m15(s), G3m16 (t), G3m6(c3), G3m24(c5), G3m26(u), G3m27(v); and for K: Km, Km1, Km2, Km3 (see, e.g., Jefferies et al. (2009) mAbs 1: 1). In certain embodiments, the antibodies variable regions described herein are linked to an Fc that binds to one or more activating Fc receptors (FcγI, FcγIIa or FcγIIIa), and thereby stimulate ADCC and may cause T cell depletion. In certain embodiments, the antibody variable regions described herein are linked to an Fc that causes depletion.

In certain embodiments, the antibody variable regions described herein may be linked to an Fc comprising one or more modification, typically to alter one or more functional properties of the antibody, such as serum half-life, complement fixation, Fc receptor binding, and/or antigen-dependent cellular cytotoxicity. Furthermore, an antibody described herein may be chemically modified (e.g., one or more chemical moieties can be attached to the antibody) or be modified to alter its glycosylation, to alter one or more functional properties of the antibody. The numbering of residues in the Fc region is that of the EU index of Kabat.

The Fc region encompasses domains derived from the constant region of an immunoglobulin, preferably a human immunoglobulin, including a fragment, analog, variant, mutant or derivative of the constant region. Suitable immunoglobulins include IgG1, IgG2, IgG3, IgG4, and other classes such as IgA, IgD, IgE and IgM, The constant region of an immunoglobulin is defined as a naturally-occurring or synthetically-produced polypeptide homologous to the immunoglobulin C-terminal region, and can include a CH1 domain, a hinge, a CH2 domain, a CH3 domain, or a CH4 domain, separately or in combination. In some embodiments, an antibody of this invention has an Fc region other than that of a wild type IgA1. The antibody can have an Fc region from that of IgG (e.g., IgG1, IgG2, IgG3, and IgG4) or other classes such as IgA2, IgD, IgE and IgM. The Fc can be a mutant form of IgA1.

The constant region of an immunoglobulin is responsible for many important antibody functions including Fc receptor (FcR) binding and complement fixation. There are five major classes of heavy chain constant region, classified as IgA, IgG, IgD, IgE, IgM, each with characteristic effector functions designated by isotype. For example, IgG is separated into four subclasses known as IgG1, IgG2, IgG3, and IgG4.

Ig molecules interact with multiple classes of cellular receptors. For example, IgG molecules interact with three classes of Fey receptors (FcγR) specific for the IgG class of antibody, namely FcγRI, FcγRII, and FcγRIIL The important sequences for the binding of IgG to the FcγR receptors have been reported to be located in the CH2 and CH3 domains. The serum half-life of an antibody is influenced by the ability of that antibody to bind to an FcR.

In certain embodiments, the Fc region is a variant Fc region, e.g., an Fc sequence that has been modified (e.g., by amino acid substitution, deletion and/or insertion) relative to a parent Fc sequence (e.g., an unmodified Fc polypeptide that is subsequently modified to generate a variant), to provide desirable structural features and/or biological activity. For example, one may make modifications in the Fc region in order to generate an Fc variant that (a) has increased or decreased ADCC, (b) increased or decreased complement-mediated cytotoxicity (CDC), (c) has increased or decreased affinity for C1q and/or (d) has increased or decreased affinity for an Fc receptor relative to the parent Fc. Such Fc region variants will generally comprise at least one amino acid modification in the Fc region. Combining amino acid modifications is thought to be particularly desirable. For example, the variant Fc region may include two, three, four, five, etc. substitutions therein, e.g., of the specific Fc region positions identified herein.

A variant Fc region may also comprise a sequence alteration wherein amino acids involved in disulfide bond formation are removed or replaced with other amino acids. Such removal may avoid reaction with other cysteine-containing proteins present in the host cell used to produce the antibodies described herein. Even when cysteine residues are removed, single chain Fc domains can still form a dimeric Fc domain that is held together non-covalently. In other embodiments, the Fc region may be modified to make it more compatible with a selected host cell. For example, one may remove the PA sequence near the N-terminus of a typical native Fc region, which may be recognized by a digestive enzyme in *E. coli* such as proline iminopeptidase. In other embodiments, one or more glycosylation sites within the Fc domain may be removed. Residues that are typically glycosylated (e.g., asparagine) may confer cytolytic response. Such residues may be deleted or substituted with unglycosylated residues (e.g., alanine). In other embodiments, sites involved in interaction with complement, such as the C1q binding site, may be removed from the Fc region. For example, one may delete or substitute the EKK sequence of human IgG1. In certain embodiments, sites that affect binding to Fc receptors may be removed, preferably sites other than salvage receptor binding sites. In other embodiments, an Fc region may be modified to remove an ADCC site. ADCC sites are known in the art; see, for example, Molec. Immunol. 29 (5): 633-9 (1992) with regard to ADCC sites in IgG1. Specific examples of variant Fc domains are disclosed for example, in WO 97/34631 and WO 96/32478.

In one embodiment, the hinge region of Fc is modified such that the number of cysteine residues in the hinge region is altered, e.g., increased or decreased. This approach is described further in U.S. Pat. No. 5,677,425 by Bodmer et al. The number of cysteine residues in the hinge region of Fc is altered to, for example, facilitate assembly of the light and heavy chains or to increase or decrease the stability of the antibody. In one embodiment, the Fc hinge region of an antibody is mutated to decrease the biological half-life of the antibody. More specifically, one or more amino acid mutations are introduced into the CH2-CH3 domain interface region of the Fc-hinge fragment such that the antibody has impaired Staphylococcyl protein A (SpA) binding relative to native Fc-hinge domain SpA binding. This approach is described in further detail in U.S. Pat. No. 6,165,745 by Ward et al.

In yet other embodiments, the Fc region is altered by replacing at least one amino acid residue with a different amino acid residue to alter the effector function(s) of the antibody. For example, one or more amino acids selected from amino acid residues 234, 235, 236, 237, 297, 318, 320 and 322 can be replaced with a different amino acid residue such that the antibody has an altered affinity for an effector ligand but retains the antigen-binding ability of the parent antibody. The effector ligand to which affinity is altered can be, for example, an Fc receptor or the CI component of complement. This approach is described in further detail in U.S. Pat. Nos. 5,624,821 and 5,648,260, both by Winter et al.

In another example, one or more amino acids selected from amino acid residues 329, 331 and 322 can be replaced with a different amino acid residue such that the antibody has altered C1q binding and/or reduced or abolished CDC. This approach is described in further detail in U.S. Pat. No. 6,194,551 by Idusogie et al.

In another example, one or more amino acid residues within amino acid positions 231 and 239 are altered to thereby alter the ability of the antibody to fix complement. This approach is described further in PCT Publication WO 94/29351 by Bodmer et al.

In yet another example, the Fc region may be modified to increase ADCC and/or to increase the affinity for an Fcγ receptor by modifying one or more amino acids at the following positions: 234, 235, 236, 238, 239, 240, 241, 243, 244, 245, 247, 248, 249, 252, 254, 255, 256, 258, 262, 263, 264, 265, 267, 268, 269, 270, 272, 276, 278, 280, 283, 285, 286, 289, 290, 292, 293, 294, 295, 296, 298, 299, 301, 303, 305, 307, 309, 312, 313, 315, 320, 322, 324, 325, 326, 327, 329, 330, 331, 332, 333, 334, 335, 337, 338, 340, 360, 373, 376, 378, 382, 388, 389, 398, 414, 416, 419, 430, 433, 434, 435, 436, 437, 438 or 439. Exemplary substitutions include 236A, 239D, 239E, 268D, 267E, 268E, 268F, 324T, 332D, and 332E. Exemplary variants include 239D/332E, 236A/332E, 236A/239D/332E, 268F/324T, 267E/268F, 267E/324T, and 267E/268F7324T. Other modifications for enhancing FcγR and complement interactions include but are not limited to substitutions 298A, 333A, 334A, 326A, 247I, 339D, 339Q, 280H, 290S, 298D, 298V, 243L, 292P, 300L, 396L, 305I, and 396L. These and other modifications are reviewed in Strohl, 2009, Current Opinion in Biotechnology 20:685-691.

Fc modifications that increase binding to an Fcγ receptor include amino acid modifications at any one or more of amino acid positions 238, 239, 248, 249, 252, 254, 255, 256, 258, 265, 267, 268, 269, 270, 272, 279, 280, 283, 285, 298, 289, 290, 292, 293, 294, 295, 296, 298, 301, 303, 305, 307, 312, 315, 324, 327, 329, 330, 335, 337, 3338, 340, 360, 373, 376, 379, 382, 388, 389, 398, 414, 416, 419, 430, 434, 435, 437, 438 or 439 of the Fc region, wherein the numbering of the residues in the Fc region is that of the EU index as in abat (WO00/42072).

Other Fc modifications that can be made to Fcs are those for reducing or ablating binding to FcγR and/or complement proteins, thereby reducing or ablating Fc-mediated effector functions such as ADCC, ADCP, and CDC. Exemplary modifications include but are not limited substitutions, insertions, and deletions at positions 234, 235, 236, 237, 267, 269, 325, and 328, wherein numbering is according to the EU index. Exemplary substitutions include but are not limited to 234G, 235G, 236R, 237K, 267R, 269R, 325L, and 328R, wherein numbering is according to the EU index. An Fc variant may comprise 236R/328R. Other modifications for reducing FcγR and complement interactions include substitutions 297A, 234A, 235A, 237A, 318A, 228P, 236E, 268Q, 309L, 330S, 331S, 220S, 226S, 229S, 238S, 233P, and 234V, as well as removal of the glycosylation at position 297 by mutational or enzymatic means or by production in organisms such as bacteria that do not glycosylate proteins. These and other modifications are reviewed in Strohl, 2009, Current Opinion in Biotechnology 20:685-691.

Optionally, the Fc region may comprise a non-naturally occurring amino acid residue at additional and/or alternative positions known to one skilled in the art (see, e.g., U.S. Pat. Nos. 5,624,821; 6,277,375; 6,737,056; 6,194,551; 7,317,091; 8,101,720; WO00/42072; WO01/58957; WO02/06919; WO04/016750; WO04/029207; WO04/035752; WO04/074455; WO04/099249; WO04/063351; WO05/070963; WO05/040217, WO05/092925 and WO06/020114).

Fc variants that enhance affinity for an inhibitory receptor FcγRIIb may also be used. Such variants may provide an Fc fusion protein with immune-modulatory activities related to FcγRIIb cells, including for example B cells and monocytes. In one embodiment, the Fc variants provide selectively enhanced affinity to FcγRIIb relative to one or more activating receptors. Modifications for altering binding to FcγRIIb include one or more modifications at a position selected from the group consisting of 234, 235, 236, 237, 239, 266, 267, 268, 325, 326, 327, 328, and 332, according to the EU index. Exemplary substitutions for enhancing FcγRIIb affinity include but are not limited to 234D, 234E, 234F, 234W, 235D, 235F, 235R, 235Y, 236D, 236N, 237D, 237N, 239D, 239E, 266M, 267D, 267E, 268D, 268E, 327D, 327E, 328F, 328W, 328Y, and 332E. Exemplary substitutions include 235Y, 236D, 239D, 266M, 267E, 268D, 268E, 328F, 328W, and 328Y. Other Fc variants for enhancing binding to FcγRIIb include 235Y/267E, 236D/267E, 239D/268D, 239D/267E, 267E/268D, 267E/268E, and 267E/328F.

The affinities and binding properties of an Fc region for its ligand may be determined by a variety of in vitro assay methods (biochemical or immunological based assays) known in the art including but not limited to, equilibrium methods (e.g., ELISA, or radioimmunoassay), or kinetics (e.g., BIACORE analysis), and other methods such as indirect binding assays, competitive inhibition assays, fluorescence resonance energy transfer (FRET), gel electrophoresis and chromatography (e.g., gel filtration). These and other methods may utilize a label on one or more of the components being examined and/or employ a variety of detection methods including but not limited to chromogenic, fluorescent, luminescent, or isotopic labels. A detailed description of binding affinities and kinetics can be found in Paul, W. E., ed., Fundamental immunology, 4th Ed., Lippincott-Raven, Philadelphia (1999), which focuses on antibody-immunogen interactions.

In certain embodiments, the antibody is modified to increase its biological half-life. Various approaches are possible. For example, this may be done by increasing the binding affinity of the Fc region for FcRn. For example, one or more of following residues can be mutated: 252, 254, 256, 433, 435, 436, as described in U.S. Pat. No. 6,277,375. Specific exemplary substitutions include one or more of the following: T252L, T254S, and/or T256F. Alternatively, to increase the biological half-life, the antibody can be altered within the CH1 or CL region to contain a salvage receptor binding epitope taken from two loops of a CH2 domain of an Fc region of an IgG, as described in U.S. Pat. Nos. 5,869,046 and 6,121,022 by Presta et al. Other exemplary variants that increase binding to FcRn and/or improve pharmacokinetic properties include substitutions at positions 259, 308, 428, and 434, including for example 259I, 308F, 428L, 428M, 434S, 434H, 434F, 434Y, and 434M. Other variants that increase Fc binding to FcRn include: 250E, 250Q, 428L, 428F, 250Q/428L (Hinton et al, 2004, J. Biol. Chem. 279(8): 6213-6216, Hinton et al. 2006 Journal of Immunology 176:346-356), 256A, 272A, 286A, 305A, 307A, 307Q, 311A, 312A, 376A, 378Q, 380A, 382A, 434A (Shields et al, Journal of Biological Chemistry, 2001, 276 (9):6591-6604), 252F, 252T, 252Y, 252W, 254T, 256S, 256R, 256Q, 256E, 256D, 256T, 309P, 311S, 433R, 433S, 433I, 433P, 433Q, 434H, 434F, 434Y, 252Y/254T/256E, 433K/434F/436H, 308T/309P/311S (Dall Acqua et al. Journal of Immunology, 2002, 169:5171-5180, Dall'Acqua et al., 2006, Journal of Biological Chemistry 281:23514-23524). Other modifications for modulating FcRn binding are described in Yeung et al., 2010, J Immunol, 182:7663-

7671. In certain embodiments, hybrid IgG isotypes with particular biological characteristics may be used. For example, an IgG1/IgG3 hybrid variant may be constructed by substituting IgG 1 positions in the CH2 and/or CH3 region with the amino acids from IgG3 at positions where the two isotypes differ. Thus a hybrid variant IgG antibody may be constructed that comprises one or more substitutions, e.g., 274Q, 276K, 300F, 339T, 356E, 358M, 384S, 392N, 397M, 4221, 435R, and 436F. In other embodiments described herein, an IgG1/IgG2 hybrid variant may be constructed by substituting IgG2 positions in the CH2 and/or CH3 region with amino acids from IgG1 at positions where the two isotypes differ. Thus a hybrid variant IgG antibody may be constructed chat comprises one or more substitutions, e.g., one or more of the following amino acid substitutions: 233E, 234L, 235L, 236G (referring to an insertion of a glycine at position 236), and 321 h.

Moreover, the binding sites on human IgG1 for FcγRI, FcγRII, FcγRIII and FcRn have been mapped and variants with improved binding have been described (see Shields, R. L. et al. (2001) J. Biol. Chem. 276:6591-6604). Specific mutations at positions 256, 290, 298, 333, 334 and 339 were shown to improve binding to FcγRIII Additionally, the following combination mutants were shown to improve FcγRIII binding: T256A/S298A, S298A/E333A, S298A/K224A and S298A/E333A/K334A, which has been shown to exhibit enhanced FcγRIIIa binding and ADCC activity (Shields et al., 2001). Other IgG1 variants with strongly enhanced binding to FcγRIIIa have been identified, including variants with S239D/I332E and S239D/I332E/A330L mutations which showed the greatest increase in affinity for FcγRIIIa, a decrease in FcγRIIb binding, and strong cytotoxic activity in cynomolgus monkeys (Lazar et al., 2006). Introduction of the triple mutations into antibodies such as alemtuzumab (CD52-specific), trastuzumab (HER2/neu-specific), rituximab (CD20-specific), and cetuximab (EGFR-specific) translated into greatly enhanced ADCC activity in vitro, and the S239D/I332E variant showed an enhanced capacity to deplete B cells in monkeys (Lazar et al., 2006). In addition, IgG1 mutants containing L235V, F243L, R292P, Y300L and P396L mutations which exhibited enhanced binding to FcγRIIIa and concomitantly enhanced ADCC activity in transgenic mice expressing human FcγRIIIa in models of B cell malignancies and breast cancer have been identified (Stavenhagen et al., 2007; Nordstrom et al., 2011). Other Fc mutants that may be used include: S298A/E333A/L334A, S239D/I332E, S239D/I332E/A330L, L235V/F243L/R292P/Y300L/P396L, and M428L/N434S.

In certain embodiments, an Fc is chosen that has reduced binding to FcγRs. An exemplary Fc, e.g., IgG1 Fc, with reduced FcγR binding comprises the following three amino acid substitutions: L234A, L235E and G237A.

In certain embodiments, an Fc is chosen that has reduced complement fixation. An exemplary Fc, e.g., IgG1 Fc, with reduced complement fixation has the following two amino acid substitutions: A330S and P331S.

In certain embodiments, an Fc is chosen that has essentially no effector function, i.e., it has reduced binding to FcγRs and reduced complement fixation. An exemplary Fc, e.g., IgG1 Fc, that is effectorless comprises the following five mutations: L234A, L235E, G237A, A330S and P331S.

When using an IgG4 constant domain, it is usually preferable to include the substitution S228P, which mimics the hinge sequence in IgG1 and thereby stabilizes IgG4 molecules.

Antibody Derivatives

An antibody provided herein may be further modified to contain additional nonproteinaceous moieties that are known in the art and readily available. The moieties suitable for derivatization of the antibody include but are not limited to water soluble polymers.

Non-limiting examples of water soluble polymers include, but are not limited to, PEG, copolymers of ethylene glycol/propylene glycol, carboxymethylcellulose, dextran, polyvinyl alcohol, polyvinyl pyrrolidone, poly-1,3-dioxolane, poly-1,3,6-trioxane, ethylene/maleic anhydride copolymer, polyaminoacids (either homopolymers or random copolymers), and dextran or poly(n-vinyl pyrrolidone)polyethylene glycol, propropylene glycol homopolymers, prolypropylene oxide/ethylene oxide co-polymers, polyoxyethylated polyols (e.g., glycerol), polyvinyl alcohol, and mixtures thereof. Polyethylene glycol propionaldehyde may have advantages in manufacturing due to its stability in water. The polymer may be of any molecular weight, and may be branched or unbranched. The number of polymers attached to the antibody may vary, and if more than one polymer are attached, they can be the same or different molecules. In general, the number and/or type of polymers used for derivatization can be determined based on considerations including, but not limited to, the particular properties or functions of the antibody to be improved, whether the antibody derivative will be used in a therapy under defined conditions, etc.

In another embodiment, conjugates of an antibody and nonproteinaceous moiety that may be selectively heated by exposure to radiation are provided. In one embodiment, the nonproteinaceous moiety is a carbon nanotube (Kam et al., Proc. Natl. Acad. Sci. USA 102: 11600-11605 (2005)). The radiation may be of any wavelength, and includes, but is not limited to, wavelengths that do not harm ordinary cells, but which heat the nonproteinaceous moiety to a temperature at which cells proximal to the antibody-nonproteinaceous moiety are killed.

Another modification of the antibodies described herein is pegylation. An antibody can be pegylated to, for example, increase the biological (e.g., serum) half-life of the antibody. To pegylate an antibody, the antibody, or fragment thereof, typically is reacted with PEG, such as a reactive ester or aldehyde derivative of PEG, under conditions in which one or more PEG groups become attached to the antibody or antibody fragment. Preferably, the pegylation is carried out via an acylation reaction or an alkylation reaction with a reactive PEG molecule (or an analogous reactive water-soluble polymer). As used herein, the term "polyethylene glycol" is intended to encompass any of the forms of PEG that have been used to derivatize other proteins, such as mono (CI-CIO) alkoxy- or aryloxy-polyethylene glycol or polyethylene glycol-maleimide. In certain embodiments, the antibody to be pegylated is an aglycosylated antibody. Methods for pegylating proteins are known in the art and can be applied to the antibodies described herein. See for example, EP 0 154 316 by Nishimura et al. and EP0401384 by Ishikawa et al.

The present invention also encompasses a human monoclonal antibody described herein conjugated to a therapeutic agent, a polymer, a detectable label or enzyme. In one embodiment, the therapeutic agent is a cytotoxic agent. In one embodiment, the polymer is PEG.

Methods of Productions

Antibodies may be produced using recombinant methods and compositions, e.g., as described in U.S. Pat. No. 4,816,567. In one embodiment, isolated nucleic acid encoding an antibody described herein is provided. Such nucleic acid may encode an amino acid sequence comprising the VL and/or an amino acid sequence comprising the VH of the antibody (e.g., the light and/or heavy chains of the antibody). In a further embodiment, one or more vectors (e.g., expression vectors) comprising such nucleic acid are provided. In a further embodiment, a host cell comprising such nucleic acid is provided. In one such embodiment, a host cell comprises (e.g., has been transformed with): (1) a vector comprising a nucleic acid that encodes an amino acid sequence comprising the VL of the antibody and an amino acid sequence comprising the VH of the antibody, or (2) a first vector comprising a nucleic acid that encodes an amino acid sequence comprising the VL of the antibody and a second vector comprising a nucleic acid that encodes an amino acid sequence comprising the VH of the antibody. In one embodiment, the host cell is eukaryotic, e.g., a Chinese Hamster Ovary (CHO) cell or lymphoid cell (e.g., Y0, NS0, Sp20 cell). In one embodiment, a method of making an antibody is provided, wherein the method comprises culturing a host cell comprising a nucleic acid encoding the antibody, as provided above, under conditions suitable for expression of the antibody, and optionally recovering the antibody from the host cell (or host cell culture medium).

For recombinant production of an antibody, nucleic acid encoding an antibody, e.g., as described above, is isolated and inserted into one or more vectors for further cloning and/or expression in a host cell. Such nucleic acid may be readily isolated and sequenced using conventional procedures (e.g., by using oligonucleotide probes that are capable of binding specifically to genes encoding the heavy and light chains of the antibody).

Suitable host cells for cloning or expression of antibody-encoding vectors include prokaryotic or eukaryotic cells described herein. For example, antibodies may be produced in bacteria, in particular when glycosylation and Fc effector function are not needed. For expression of antibody fragments and polypeptides in bacteria, see, e.g., U.S. Pat. Nos. 5,648,237, 5,789,199, and 5,840,523. (See also Charlton, Methods in Molecular Biology, Vol. 248 (B. K. C. Lo, ed., Humana Press, Totowa, N.J., 2003), pp. 245-254, describing expression of antibody fragments in *E. coli*.) After expression, the antibody may be isolated from the bacterial cell paste in a soluble fraction and can be further purified.

In addition to prokaryotes, eukaryotic microbes such as filamentous fungi or yeast are suitable cloning or expression hosts for antibody-encoding vectors, including fungi and yeast strains whose glycosylation pathways have been "humanized," resulting in the production of an antibody with a partially or fully human glycosylation pattern. See Gerngross, Nat. Biotech. 22:1409-1414 (2004), and Li et al., Nat. Biotech. 24:210-215 (2006).

Suitable host cells for the expression of glycosylated antibody are also derived from multicellular organisms (invertebrates and vertebrates). Examples of invertebrate cells include plant and insect cells. Numerous baculoviral strains have been identified which may be used in conjunction with insect cells, particularly for transfection of *Spodoptera frugiperda* cells.

Plant cell cultures can also be utilized as hosts. See, e.g., U.S. Pat. Nos. 5,959,177, 6,040,498, 6,420,548, 7,125,978, and 6,417,429 (describing PLANTIBODIES technology for producing antibodies in transgenic plants).

Vertebrate cells may also be used as hosts. For example, mammalian cell lines that are adapted to grow in suspension may be useful. Other examples of useful mammalian host cell lines are monkey kidney CV1 line transformed by SV40 (COS-7); human embryonic kidney line (293 or 293 cells as described, e.g., in Graham et al., J. Gen Virol. 36:59 (1977)); baby hamster kidney cells (BHK); mouse sertoli cells (TM4 cells as described, e.g., in Mather, Biol. Reprod. 23:243-251 (1980)); monkey kidney cells (CV1); African green monkey kidney cells (VERO-76); human cervical carcinoma cells (HELA); canine kidney cells (MDCK; buffalo rat liver cells (BRL 3A); human lung cells (W138); human liver cells (Hep G2); mouse mammary tumor (MMT 060562); TRI cells, as described, e.g., in Mather et al., Annals N.Y. Acad. Sci. 383:44-68 (1982); MRC 5 cells; and FS4 cells. Other useful mammalian host cell lines include CHO cells, including DHFR⁻ CHO cells (Urlaub et al., Proc. Natl. Acad. Sci. USA 77:4216 (1980)); and myeloma cell lines such as Y0, NS0 and Sp2/0. For a review of certain mammalian host cell lines suitable for antibody production, see, e.g., Yazaki and Wu, Methods in Molecular Biology, Vol. 248 (B. K. C. Lo, ed., Humana Press, Totowa, N.J.), pp. 255-268 (2003).

Compositions and Formulations

The antibodies of this invention represent an excellent way for the development of antiviral therapies either alone or in antibody cocktails with additional anti-influenza virus antibodies for the treatment of human influenza infections in humans.

In another aspect, the present invention provides a pharmaceutical composition comprising the antibodies of the present invention described herein formulated together with a pharmaceutically acceptable carrier. The composition may optionally contain one or more additional pharmaceutically active ingredients, such as another antibody or a therapeutic agent. The pharmaceutical compositions of the invention also can be administered in a combination therapy with, for example, another immune-stimulatory agent, an antiviral agent, or a vaccine, etc. In certain embodiments, a composition comprises an antibody of this invention at a concentration of at least 1 mg/ml, 5 mg/ml, 10 mg/ml, 50 mg/ml, 100 mg/ml, 150 mg/ml, 200 mg/ml, 1-300 mg/ml, or 100-300 mg/ml.

The pharmaceutical composition can comprise any number of excipients. Excipients that can be used include carriers, surface active agents, thickening or emulsifying agents, solid binders, dispersion or suspension aids, solubilizers, colorants, flavoring agents, coatings, disintegrating agents, lubricants, sweeteners, preservatives, isotonic agents, and combinations thereof. The selection and use of suitable excipients is taught in Gennaro, ed., Remington: The Science and Practice of Pharmacy, 20th Ed. (Lippincott Williams & Wilkins 2003), the disclosure of which is incorporated herein by reference.

Preferably, a pharmaceutical composition is suitable for intravenous, intramuscular, subcutaneous, parenteral, spinal or epidermal administration (e.g., by injection or infusion). Depending on the route of administration, the active compound can be coated in a material to protect it from the action of acids and other natural conditions that may inactivate it. The phrase "parenteral administration" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion. Alternatively, an antibody of the present invention described herein can be administered via a non-parenteral route, such as a topical, epidermal or mucosal route of administration, e.g., intranasally, orally, vaginally, rectally, sublingually or topically.

The pharmaceutical composition of the invention can be in the form of pharmaceutically acceptable salts. A "pharmaceutically acceptable salt" refers to a salt that retains the desired biological activity of the parent compound and does not impart any undesired toxicological effects. Examples of such salts include acid addition salts and base addition salts. Acid addition salts include those derived from nontoxic inorganic acids, such as hydrochloric, nitric, phosphoric, sulfuric, hydrobromic, hydroiodic, phosphorous and the like, as well as from nontoxic organic acids such as aliphatic mono- and dicarboxylic acids, phenyl-substituted alkanoic acids, hydroxy alkanoic acids, aromatic acids, aliphatic and aromatic sulfonic acids and the like. Base addition salts include those derived from alkaline earth metals, such as sodium, potassium, magnesium, calcium and the like, as well as from nontoxic organic amines, such as N,N'-dibenzylethylenediamine, N-methylglucamine, chloroprocaine, choline, diethanolamine, ethylenediamine, procaine and the like.

The pharmaceutical composition of the present invention can be in the form of sterile aqueous solutions or dispersions. It can also be formulated in a microemulsion, liposome, or other ordered structure suitable to high drug concentration.

An antibody of the present invention described herein can be administered as a sustained release formulation, in which case less frequent administration is required. Dosage and frequency vary depending on the half-life of the antibody in the patient. In general, human antibodies show the longest half-life, followed by humanized antibodies, chimeric antibodies, and nonhuman antibodies. The dosage and frequency of administration can vary depending on whether the treatment is prophylactic or therapeutic. In prophylactic applications, a relatively low dosage is administered at relatively infrequent intervals over a long period of time. Some patients continue to receive treatment for the rest of their lives. In therapeutic applications, a relatively high dosage at relatively short intervals is sometimes required until progression of the disease is reduced or terminated, and preferably, until the patient shows partial or complete amelioration of symptoms of disease. Thereafter, the patient can be administered a prophylactic regime.

The amount of active ingredient that can be combined with a carrier material to produce a single dosage form will vary depending upon the subject being treated and the particular mode of administration and will generally be that amount of the composition, which produces a therapeutic effect. Generally, out of one hundred percent, this amount will range from about 0.01% to about 99% of active ingredient, preferably from about 0.1% to about 70%, most preferably from about 1% to about 30% of active ingredient in combination with a pharmaceutically acceptable carrier.

Dosage regimens can be adjusted to provide the optimum desired response (e.g., a therapeutic response). For example, a single bolus can be administered, several divided doses can be administered over time or the dose can be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active compound calculated to produce the desired therapeutic effect in association with the required pharmaceutical carrier. Alternatively, antibody can be administered as a sustained release formulation, in which case less frequent administration is required. For administration of the antibody, the dosage ranges from about 0.0001 to 100 mg/kg, and more usually 0.01 to 5 mg/kg, of the host body weight. For example dosages can be 0.3 mg/kg body weight, 1 mg/kg body weight, 3 mg/kg body weight, 5 mg/kg body weight or 10 mg/kg body weight or within the range of 1-10 mg/kg. An exemplary treatment regime entails administration once per week, once every two weeks, once every three weeks, once every four weeks, once a month, once every 3 months or once every three to 6 months. Preferred dosage regimens for an antibody of the invention include 1 mg/kg body weight or 3 mg/kg body weight via intravenous administration, with the antibody being given using one of the following dosing schedules: (i) every four weeks for six dosages, then every three months; (ii) every three weeks; (iii) 3 mg/kg body weight once followed by 1 mg/kg body weight every three weeks. In some methods, dosage is adjusted to achieve a plasma antibody concentration of about 1-1000 µg/ml and in some methods about 25-300 µg/ml. A "therapeutically effective dosage" of an antibody of the invention preferably results in a decrease in severity of disease symptoms, an increase in frequency and duration of disease symptom-free periods, or a prevention of impairment or disability due to the disease affliction. For example, for the treatment of influenza infection in a subject, a "therapeutically effective dosage" preferably inhibits influenza virus replication or uptake by host cells by at least about 20%, more preferably by at least about 40%, even more preferably by at least about 60%, and still more preferably by at least about 80% relative to untreated subjects. A therapeutically effective amount of a therapeutic compound can neutralize influenza virus, or otherwise ameliorate symptoms in a subject, which is typically a human or can be another mammal. The pharmaceutical composition can be a controlled release formulation, including implants, transdermal patches, and microencapsulated delivery systems. Biodegradable, biocompatible polymers can be used, such as ethylene vinyl acetate, polyanhydrides, polyglycolic acid, collagen, polyorthoesters, and polylactic acid. See, e.g., Sustained and Controlled Release Drug Delivery Systems, J. R. Robinson, ed., Marcel Dekker, Inc., New York, 1978.

Therapeutic compositions can be administered via medical devices such as (1) needleless hypodermic injection devices (e.g., U.S. Pat. Nos. 5,399,163; 5,383,851; 5,312,335; 5,064,413; 4,941,880; 4,790,824; and 4,596,556); (2) micro-infusion pumps (U.S. Pat. No. 4,487,603); (3) transdermal devices (U.S. Pat. No. 4,486,194); (4) infusion apparati (U.S. Pat. Nos. 4,447,233 and 4,447,224); and (5) osmotic devices (U.S. Pat. Nos. 4,439,196 and 4,475,196); the disclosures of which are incorporated herein by reference.

In certain embodiments, the human monoclonal antibodies of the invention described herein can be formulated to ensure proper distribution in vivo. For example, to ensure that the therapeutic compounds of the invention cross the blood-brain barrier, they can be formulated in liposomes, which may additionally comprise targeting moieties to enhance selective transport to specific cells or organs. See, e.g., U.S. Pat. Nos. 4,522,811; 5,374,548; 5,416,016; and 5,399,331; V. V. Ranade (1989) Clin. Pharmacol. 29:685; Umezawa et al, (1988) Biochem. Biophys. Res. Commun. 153:1038; Bloeman et al. (1995) FEBS Lett. 357:140; M. Owais et al. (1995) Antimicrob. Agents Chemother. 39:180; Briscoe et al. (1995) Am. Physiol. 1233:134; Schreier et al.

(1994). Biol. Chem. 269:9090; Keinanen and Laukkanen (1994) FEBS Lett. 346:123; and Killion and Fidler (1994) Immunomethods 4:273.

Uses and Methods

The current anti-viral treatments (e.g., oseltamivir/Tamiflu, amantadine/rimantadine) for influenza are sub-optimal with increasing incidence of resistance and a limited therapeutic window (must start<48 hours after symptom onset) (Beigel J, et al. 2008. Antiviral Res 78:91-102; Garcia-Sastre A. 2006. Emerg Infect Dis 12:44-47; and Marathe B M, et al. 2016. Sci Rep 6:26742). Monoclonal antibodies continue to be a growing class of drugs in part due to their high degree of specificity, limited off-target effects, and superb safety profile. The antibodies, compositions and formulations described herein can be used to neutralize influenza virus and thereby treating influenza infections.

Accordingly, in one aspect, the antibodies described herein can be used to neutralize influenza virus. The neutralizing of the influenza virus can be done via (i) inhibiting influenza virus binding to a target cell; (ii) inhibiting influenza virus uptake by a target cell; (iii) inhibiting influenza virus replication; and (iv) inhibiting influenza virus particles release from infected cells. One skilled in the art possesses the ability to perform any assay to assess neutralization of influenza virus. Notably, the neutralizing properties of antibodies may be assessed by a variety of tests, which all may assess the consequences of (i) inhibition of influenza virus binding to a target cell; (ii) inhibition of influenza virus uptake by a target cell; (iii) inhibition of influenza virus replication; and (iv) inhibition of influenza virus particles release from infected cells. In other words, implementing different tests may lead to the observation of the same consequence, i.e., the loss of infectivity of the influenza virus. Thus, in one embodiment, the present invention provides a method of neutralizing influenza virus in a subject comprising administering to the subject a therapeutically effect amount of the antibody of the present invention described herein.

Another aspect of the present invention provides a method of treating an influenza-related disease. Such method includes therapeutic (following influenza infection) and prophylactic (prior to influenza exposure, infection or pathology). For example, therapeutic and prophylactic methods of treating an individual for an influenza infection include treatment of an individual having or at risk of having an influenza infection or pathology, treating an individual with an influenza infection, and methods of protecting an individual from an influenza infection, to decrease or reduce the probability of an influenza infection in an individual, to decrease or reduce susceptibility of an individual to an influenza infection, or to inhibit or prevent an influenza infection in an individual, and to decrease, reduce, inhibit or suppress transmission of an influenza from an infected individual to an uninfected individual. Such methods include administering an antibody of the present invention or a composition comprising the antibody disclosed herein to therapeutically or prophylactically treat (vaccinate or immunize) an individual having or at risk of having an influenza infection or pathology. Accordingly, methods can treat the influenza infection or pathology, or provide the individual with protection from infection (e.g., prophylactic protection).

In one embodiment, a method of treating an influenza-related disease comprises administering to an individual in need thereof an antibody or therapeutic composition disclosed herein in an amount sufficient to reduce one or more physiological conditions or symptom associated with an influenza infection or pathology, thereby treating the influenza-related disease.

In one embodiment, an antibody or therapeutic composition disclosed herein is used to treat an influenza-related disease. Use of an antibody or therapeutic composition disclosed herein treats an influenza-related disease by reducing one or more physiological conditions or symptom associated with an influenza infection or pathology. In aspects of this embodiment, administration of an antibody or therapeutic composition disclosed herein is in an amount sufficient to reduce one or more physiological conditions or symptom associated with an influenza infection or pathology, thereby treating the influenza-based disease. In other aspects of this embodiment, administration of an antibody or therapeutic composition disclosed herein is in an amount sufficient to increase, induce, enhance, augment, promote or stimulate influenza clearance or removal; or decrease, reduce, inhibit, suppress, prevent, control, or limit transmission of influenza to another individual.

One or more physiological conditions or symptom associated with an influenza infection or pathology will respond to a method of treatment disclosed herein. The symptoms of influenza infection or pathology vary, depending on the phase of infection.

In another aspect of the present invention, the antibody described herein can be used in various detection methods, for use in, e.g., monitoring the progression of an influenza infection; monitoring patient response to treatment for such an infection, etc. The present disclosure provides methods of detecting a HA or NA polypeptide in a biological sample obtained from an individual. The methods generally involve: a) contacting the biological sample with a subject anti-HA or -NA antibody; and b) detecting binding, if any, of the antibody to an epitope present in the sample. In some instances, the antibody comprises a detectable label. The level of HA or NA polypeptide detected in the biological sample can provide an indication of the stage, degree, or severity of an influenza infection. The level of the HA or NA polypeptide detected in the biological sample can provide an indication of the individual's response to treatment for an influenza infection.

The antibodies described herein can be used together with one or more of other anti-influenza virus antibodies to neutralize influenza virus and thereby treating influenza infections.

Definitions

The term "antibody" as referred to herein includes whole antibodies and any antigen-binding fragment or single chains thereof. Whole antibodies are glycoproteins comprising at least two heavy (H) chains and two light (L) chains inter-connected by disulfide bonds. Each heavy chain is comprised of a heavy chain variable region (abbreviated herein as $V_H$) and a heavy chain constant region. The heavy chain constant region is comprised of three domains, $C_H1$, $C_H2$ and $C_H3$. Each light chain is comprised of a light chain variable region (abbreviated herein as $V_L$) and a light chain constant region. The light chain constant region is comprised of one domain, $C_L$. The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxy-terminus in the following order: FR1, CDR1, FR2, CDR2, FR3, CDR3, FR4. The heavy chain variable region CDRs and FRs are HFR1, HCDR1, HFR2, HCDR2, HFR3, HCDR3, HFR4. The light chain variable region CDRs and FRs are LFR1, LCDR1, LFR2, LCDR2, LFR3, LCDR3, LFR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (CIq) of the classical complement system.

The term "antibody" as used herein is used in the broadest sense and specifically may include any immunoglobulin, whether natural or partly or wholly synthetically produced, including but not limited to monoclonal antibodies, polyclonal antibodies, multispecific antibodies (for example, bispecific antibodies and polyreactive antibodies), and antibody fragments.

The term "bispecific antibody" refers to artificial immunoglobulin constructs that are comprised of fragments of two different monoclonal antibodies that bind to two different antigens. There are several distinct types of bispecific antibodies, including but not limited to trifunctional antibodies and chemically linked Fabs. The antibodies of described herein may comprise bispecific antibodies, and include fragments of one or more different anti-HA or NA antibodies, including one or more different antibodies described herein or known anti-influenza virus antibodies. Methods of making and use bispecific antibodies thereof are described in, e.g., PCT/US16/64713, hereby incorporated by reference.

The term "antigen-binding fragment or portion" of an antibody (or simply "antibody fragment or portion"), as used herein, refers to one or more fragments of an antibody that retain the ability to specifically bind to an antigen (e.g., a HA or NA of influenza A or B virus). It has been shown that the antigen-binding function of an antibody can be performed by fragments of a full-length antibody. Examples of binding fragments encompassed within the term "antigen-binding fragment or portion" of an antibody include (i) a Fab fragment, a monovalent fragment consisting of the $V_L$, $V_H$, $C_L$ and $C_H1$ domains; (ii) a F(ab')2 fragment, a bivalent fragment comprising two Fab fragments linked by a disulfide bridge at the hinge region; (iii) a Fab' fragment, which is essentially an Fab with part of the hinge region (see, FUNDAMENTAL IMMUNOLOGY (Paul ed., $3^{rd}$ ed. 1993)); (iv) a Fd fragment consisting of the $V_H$ and $C_H1$ domains; (v) a Fv fragment consisting of the $V_L$ and VH domains of a single arm of an antibody, (vi) a dAb fragment (Ward et al., (1989) Nature 341:544-546), which consists of a VH domain; (vii) an isolated CDR; and (viii) a nanobody, a heavy chain variable region containing a single variable domain and two constant domains. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv or scFv); see e.g., Bird et al. (1988) Science 242:423-426; and Huston et al. (1988) Proc. Natl. Acad. Sci. USA 85:5879-5883). Such single chain antibodies are also intended to be encompassed within the term "antigen-binding fragment or portion" of an antibody. These antibody fragments are obtained using conventional techniques known to those with skill in the art, and the fragments are screened for utility in the same manner as are intact antibodies.

An "isolated antibody", as used herein, is intended to refer to an antibody that is substantially free of other antibodies having different antigenic specificities (e.g., an isolated antibody that specifically binds to a specific antigen, such as a HA or NA of influenza A or B virus, is substantially free of antibodies that specifically bind antigens other than the specific antigen). An isolated antibody can be substantially free of other cellular material and/or chemicals.

The terms "monoclonal antibody" or "monoclonal antibody composition" as used herein refer to a preparation of antibody molecules of single molecular composition. A monoclonal antibody composition displays a single binding specificity and affinity for a particular epitope.

The term "human antibody" is intended to include antibodies having variable regions in which both the framework and CDR regions are derived from human germline immunoglobulin sequences. Furthermore, if the antibody contains a constant region, the constant region also is derived from human germline immunoglobulin sequences. The human antibodies of the invention can include amino acid residues not encoded by human germline immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences.

The term "human monoclonal antibody" refers to antibodies displaying a single binding specificity, which have variable regions in which both the framework and CDR regions are derived from human germline immunoglobulin sequences. In one embodiment, the human monoclonal antibodies can be produced by a hybridoma that includes a B cell obtained from a transgenic nonhuman animal, e.g., a transgenic mouse, having a genome comprising a human heavy chain transgene and a light chain transgene fused to an immortalized cell.

The term "recombinant human antibody", as used herein, includes all human antibodies that are prepared, expressed, created or isolated by recombinant means, such as (a) antibodies isolated from an animal (e.g., a mouse) that is transgenic or transchromosomal for human immunoglobulin genes or a hybridoma prepared therefrom (described further below), (b) antibodies isolated from a host cell transformed to express the human antibody, e.g., from a transfectoma, (c) antibodies isolated from a recombinant, combinatorial human antibody library, and (d) antibodies prepared, expressed, created or isolated by any other means that involve splicing of human immunoglobulin gene sequences to other DNA sequences. Such recombinant human antibodies have variable regions in which the framework and CDR regions are derived from human germline immunoglobulin sequences. In certain embodiments, however, such recombinant human antibodies can be subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline $V_H$ and $V_L$ sequences, may not naturally exist within the human antibody germline repertoire in vivo.

The term "isotype" refers to the antibody class (e.g., IgM or IgG1) that is encoded by the heavy chain constant region genes. The phrases "an antibody recognizing an antigen"

and "an antibody specific for an antigen" are used interchangeably herein with the term "an antibody which binds specifically to an antigen."

The term "human antibody derivatives" refers to any modified form of the human antibody, e.g., a conjugate of the antibody and another agent or antibody. The term "humanized antibody" is intended to refer to antibodies in which CDR sequences derived from the germline of another mammalian species, such as a mouse, have been grafted onto human framework sequences. Additional framework region modifications can be made within the human framework sequences.

The term "chimeric antibody" is intended to refer to antibodies in which the variable region sequences are derived from one species and the constant region sequences are derived from another species, such as an antibody in which the variable region sequences are derived from a mouse antibody and the constant region sequences are derived from a human antibody. The term can also refer to an antibody in which its variable region sequence or CDR(s) is derived from one source (e.g., an IgA1 antibody) and the constant region sequence or Fc is derived from a different source (e.g., a different antibody, such as an IgG, IgA2, IgD, IgE or IgM antibody).

As used herein, the term "affinity" refers to the strength of the sum total of noncovalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and antigen). The affinity of a molecule X for its partner Y can generally be represented by the dissociation constant (KD). Affinity can be measured by common methods known in the art, including those described herein.

As used herein, an antibody that "specifically binds to a HA of influenza virus" refers to an antibody that binds to a HA of influenza virus but does not substantially bind to non-influenza virus HA. Similarly, an antibody that "specifically binds to a NA of influenza virus" refers to an antibody that binds to a NA of influenza virus but does not substantially bind to non-influenza virus NA.

Preferably, the antibody binds to the HA or NA with "high affinity", namely with a KD of $1\times10^{-7}$ M or less, more preferably $5\times10^{-8}$ M or less, more preferably $3\times10^{-8}$ M or less, more preferably $1\times10^{-8}$ M or less, more preferably $5\times10^{-9}$ M or less or even more preferably $1\times10^{-9}$ M or less. The term "does not substantially bind" to a protein or cells, as used herein, means does not bind or does not bind with a high affinity to the protein or cells, i.e., binds to the protein or cells with a KD of $1\times10^{-4}$ M or more, more preferably $1\times10^{-5}$ M or more, more preferably $1\times10^{-4}$ M or more, more preferably $1\times10^{-3}$ M or more, even more preferably $1\times10^{-2}$ M or more.

The term "Kassoc" or "Ka", as used herein, is intended to refer to the association rate of a particular antibody-antigen interaction, whereas the term "Kdis" or "Kd," as used herein, is intended to refer to the dissociation rate of a particular antibody-antigen interaction. The term "KD," as used herein, is intended to refer to the dissociation constant, which is obtained from the ratio of Kd to Ka (i.e., Kd/Ka) and is expressed as a molar concentration (M). KD values for antibodies can be determined using methods well established in the art. A preferred method for determining the KD of an antibody is by using surface plasmon resonance, preferably using a biosensor system such as a Biacore® system.

The term "epitope" as used herein refers to an antigenic determinant that interacts with a specific antigen-binding site in the variable region of an antibody molecule known as a paratope. A single antigen may have more than one epitope. Thus, different antibodies may bind to different areas on an antigen and may have different biological effects. The term "epitope" also refers to a site on an antigen to which B and/or T cells respond. It also refers to a region of an antigen that is bound by an antibody. Epitopes may be defined as structural or functional. Functional epitopes are generally a subset of the structural epitopes and have those residues that directly contribute to the affinity of the interaction. Epitopes may also be conformational, that is, composed of non-linear amino acids. In certain embodiments, epitopes may include determinants that are chemically active surface groupings of molecules such as amino acids, sugar side chains, phosphoryl groups, or sulfonyl groups, and, in certain embodiments, may have specific three-dimensional structural characteristics, and/or specific charge characteristics. An epitope typically includes at least 3, 4, 5, 6, 7, 8, 9, 10, 11, 12, 13, 14 or 15 amino acids in a unique spatial conformation. Methods for determining what epitopes are bound by a given antibody (i.e., epitope mapping) are well known in the art and include, for example, immunoblotting and immune-precipitation assays, wherein overlapping or contiguous peptides from a HA or NA protein are tested for reactivity with a given antibody. Methods of determining spatial conformation of epitopes include techniques in the art and those described herein, for example, x-ray crystallography and 2-dimensional nuclear magnetic resonance (see, e.g., Epitope Mapping Protocols in Methods in Molecular Biology, Vol. 66, G. E. Morris, Ed. (1996)).

The term "epitope mapping" refers to the process of identification of the molecular determinants for antibody-antigen recognition.

The term "binds to an epitope" or "recognizes an epitope" with reference to an antibody or antibody fragment refers to continuous or discontinuous segments of amino acids within an antigen. Those of skill in the art understand that the terms do not necessarily mean that the antibody or antibody fragment is in direct contact with every amino acid within an epitope sequence.

The term "binds to the same epitope" with reference to two or more antibodies means that the antibodies bind to the same, overlapping or encompassing continuous or discontinuous segments of amino acids. Those of skill in the art understand that the phrase "binds to the same epitope" does not necessarily mean that the antibodies bind to or contact exactly the same amino acids. The precise amino acids that the antibodies contact can differ. For example, a first antibody can bind to a segment of amino acids that is completely encompassed by the segment of amino acids bound by a second antibody. In another example, a first antibody binds one or more segments of amino acids that significantly overlap the one or more segments bound by the second antibody. For the purposes herein, such antibodies are considered to "bind to the same epitope."

Antibodies that "compete with another antibody for binding to a target" refer to antibodies that inhibit (partially or completely) the binding of the other antibody to the target. Whether two antibodies compete with each other for binding to a target, i.e., whether and to what extent one antibody inhibits the binding of the other antibody to a target, may be determined using known competition experiments. In certain embodiments, an antibody competes with, and inhibits binding of another antibody to a target by at least 10%, 20%, 30%, 40%, 50%, 60%, 70%, 80%, 90% or 100%. The level of inhibition or competition may be different depending on which antibody is the "blocking antibody" (i.e., the cold antibody that is incubated first with the target). Competition assays can be conducted as described, for example, in Ed Harlow and David Lane, Cold Spring Harb Protoc; 2006; doi: 10.1101/pdb.prot4277 or in Chapter 11 of "Using Antibodies" by Ed Harlow and David Lane, Cold Spring Harbor Laboratory Press, Cold Spring Harbor, NY, USA 1999. Competing antibodies bind to the same epitope, an overlapping epitope or to adjacent epitopes (e.g., as evidenced by steric hindrance). Other competitive binding assays include: solid phase direct or indirect radioimmunoassay (RIA), solid phase direct or indirect enzyme immunoassay (EIA), sandwich competition assay (see Stahli et al., Methods in Enzymology 9:242 (1983)); solid phase direct biotin-avidin EIA (see Kirkland et al., J. Immunol. 137:3614 (1986)); solid phase direct labeled assay, solid phase direct labeled sandwich assay (see Harlow and Lane, Antibodies: A Laboratory Manual, Cold Spring Harbor Press (1988)); solid phase direct label RIA using 1-125 label (see Morel et al., Mol. Immunol. 25(1):7 (1988)); solid phase direct biotin-avidin EIA (Cheung et al., Virology 176:546 (1990)); and direct labeled RIA. (Moldenhauer et al., Scand. J. Immunol. 32:77 (1990)).

As used herein, the term "immune response" refers to a biological response within a vertebrate against foreign agents, which response protects the organism against these agents and diseases caused by them. An immune response is mediated by the action of a cell of the immune system (for example, a T lymphocyte, B lymphocyte, natural killer (NK) cell, macrophage, eosinophil, mast cell, dendritic cell or neutrophil) and soluble macromolecules produced by any of these cells or the liver (including antibodies, cytokines, and complement) that results in selective targeting, binding to, damage to, destruction of, and/or elimination from the vertebrate's body of invading pathogens, cells or tissues infected with pathogens, cancerous or other abnormal cells, or, in cases of autoimmunity or pathological inflammation, normal human cells or tissues. An immune reaction includes, e.g., activation or inhibition of a T cell, e.g., an effector T cell or a Th cell, such as a CD4+ or CD8+ T cell, or the inhibition of a Treg cell.

The term "detectable label" as used herein refers to a molecule capable of detection, including, but not limited to, radioactive isotopes, fluorescers, chemiluminescers, chromophores, enzymes, enzyme substrates, enzyme cofactors, enzyme inhibitors, chromophores, dyes, metal ions, metal sols, ligands (e.g., biotin, avidin, streptavidin or haptens), intercalating dyes and the like. The term "fluorescer" refers to a substance or a portion thereof that is capable of exhibiting fluorescence in the detectable range.

As used herein, the term "subject" refers to an animal. Preferably, the animal is a mammal. A subject also refers to for example, primates (e.g., humans), cows, sheep, goats, horses, dogs, cats, rabbits, rats, mice, fish, birds and the like. In a preferred embodiment, the subject is a human.

As used herein, the term "therapeutically effective amount" of a compound of the present invention refers to an amount of the compound of the present invention that will elicit the biological or medical response of a subject, or ameliorate symptoms, slow or delay disease progression, or prevent a disease, etc. In one embodiment, the term refers to the amount that inhibits or reduces microbial colonization or infection. In one embodiment, the term refers to the amount that inhibits or reduces infection, or prevent or destroying the formation of bacterial biofilms. When applied to an individual active ingredient, administered alone, the term refers to that ingredient alone. When applied to a combination, the term refers to combined amounts of the active ingredients that result in the therapeutic effect, whether administered in combination, serially or simultaneously.

As used herein, the term "pharmaceutically acceptable carrier or excipient" refers to a carrier medium or an excipient which does not interfere with the effectiveness of the biological activity of the active ingredient(s) of the composition and which is not excessively toxic to the host at the concentrations at which it is administered. In the context of the present invention, a pharmaceutically acceptable carrier or excipient is preferably suitable for topical formulation. The term includes, but is not limited to, a solvent, a stabilizer, a solubilizer, a tonicity enhancing agent, a structure-forming agent, a suspending agent, a dispersing agent, a chelating agent, an emulsifying agent, an antifoaming agent, an ointment base, an emollient, a skin protecting agent, a gel-forming agent, a thickening agent, a pH adjusting agent, a preservative, a penetration enhancer, a complexing agent, a lubricant, a demulcent, a viscosity enhancer, a bioadhesive polymer, or a combination thereof. The use of such agents for the formulation of pharmaceutically active substances is well known in the art (see, for example, "Remington's Pharmaceutical Sciences", E. W. Martin, 18th Ed., 1990, Mack Publishing Co.: Easton, PA, which is incorporated herein by reference in its entirety).

As used herein, the term "treating" or "treatment" of any disease or disorder refers in one embodiment, to ameliorating the disease or disorder (i.e., arresting or reducing the development of the disease or at least one of the clinical symptoms thereof). In another embodiment, "treating" or "treatment" refers to ameliorating at least one physical parameter, which may not be discernible by the patient. In yet another embodiment, "treating" or "treatment" refers to modulating the disease or disorder, either physically, (e.g., stabilization of a discernible symptom), physiologically, (e.g., stabilization of a physical parameter), or both. In yet another embodiment, "treating" or "treatment" refers to preventing or delaying the onset or development or progression of the disease or disorder.

As used herein, the term "a," "an," "the" and similar terms used in the context of the present invention (especially in the context of the claims) are to be construed to cover both the singular and plural unless otherwise indicated herein or clearly contradicted by the context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

The term "about" refers to within 10%, preferably within 5%, and more preferably within 1% of a given value or range. Alternatively, the term "about" refers to within an acceptable standard error of the mean, when considered by one of ordinary skill in the art.

EXAMPLES

Example 1 Generation of hmAbs

Peripheral blood plasmablasts (CD19+IgD-CD38+ CD27++) were single cell sorted from subjects approximately seven days after immunization with the 2014-2015 seasonal inactivated quadrivalent influenza vaccine. Using single cell PCR the immunoglobulin heavy (VH) and light (Vk or Vl) chain variable regions were sequenced. Using the immunoglobulin expression cassette process described by Liao et al. J Virol Methods. 2009 June; 158(1-2):171-9 (PMC2805188) and corresponding plasmids obtained by Dr. Kevin Saunders (Duke University), heavy and light chain variable regions were expressed from these single cell sorted plasmablasts. The immunoglobulins were screened for binding and neutralization of H3 and N2 proteins and H3N2 virus respectively. The immunoglobulin heavy and light chain pairs with the greatest breadth and activity were then cloned as full IgG1 human monoclonal antibodies, and their gene usage is detailed in Table 1.

TABLE 1

Immunoglobulin gene usage

| hmAb | Specificity | Heavy chain | Light chain |
|---|---|---|---|
| 1086G8 | HA | IGHV3-23 IGHD3-9 IGHJ4 | IGKV3-15 IGKJ2 |
| 1092C4 | HA | IGHV1-18 IGHD3-3 IGHJ6 | IGKV3-20 IGKJ1 |
| 1092E4 | HA | IGHV1-18 IGHD3-3 IGHJ6 | IGKV3-20 IGKJ1 |
| 1122A11 | NA | IGHV1-46 IGHD3-22 IGHJ6 | IGLV3-1 IGLJ2 |
| 1122B9 | NA | IGHV3-53 IGHD3-22 IGHJ4 | IGKV1-33 IGKJ4 |

Example 2 In Vitro Activity of hmAbs

Figure 1B:
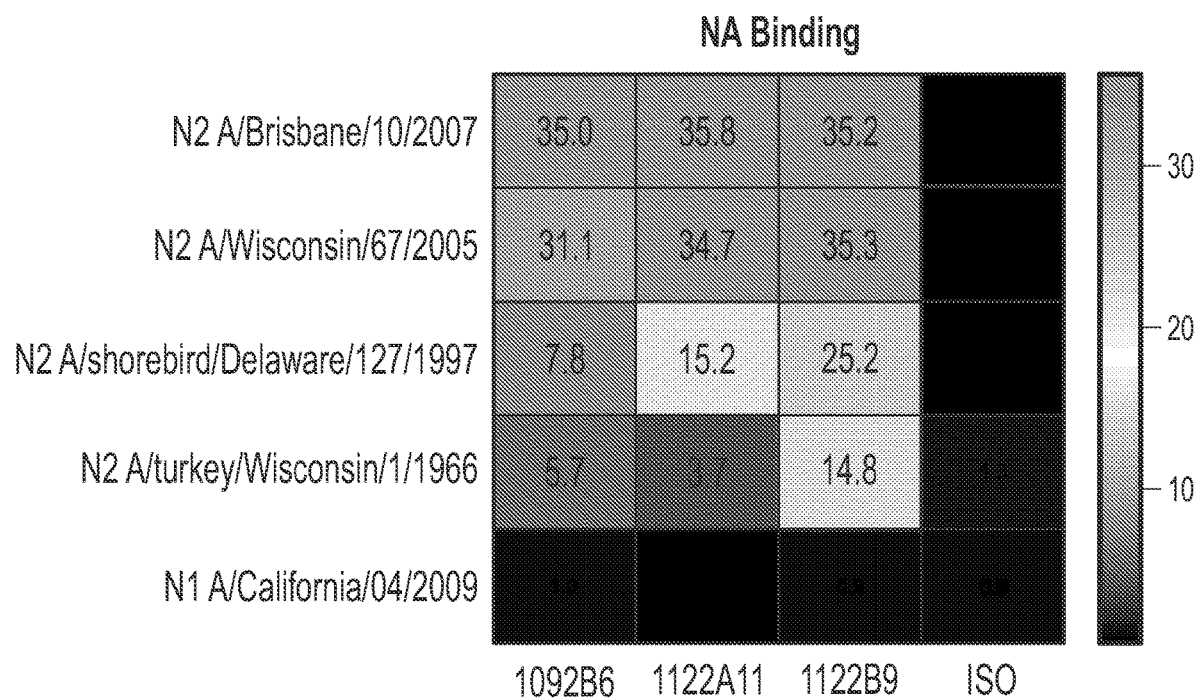
Figure 2:
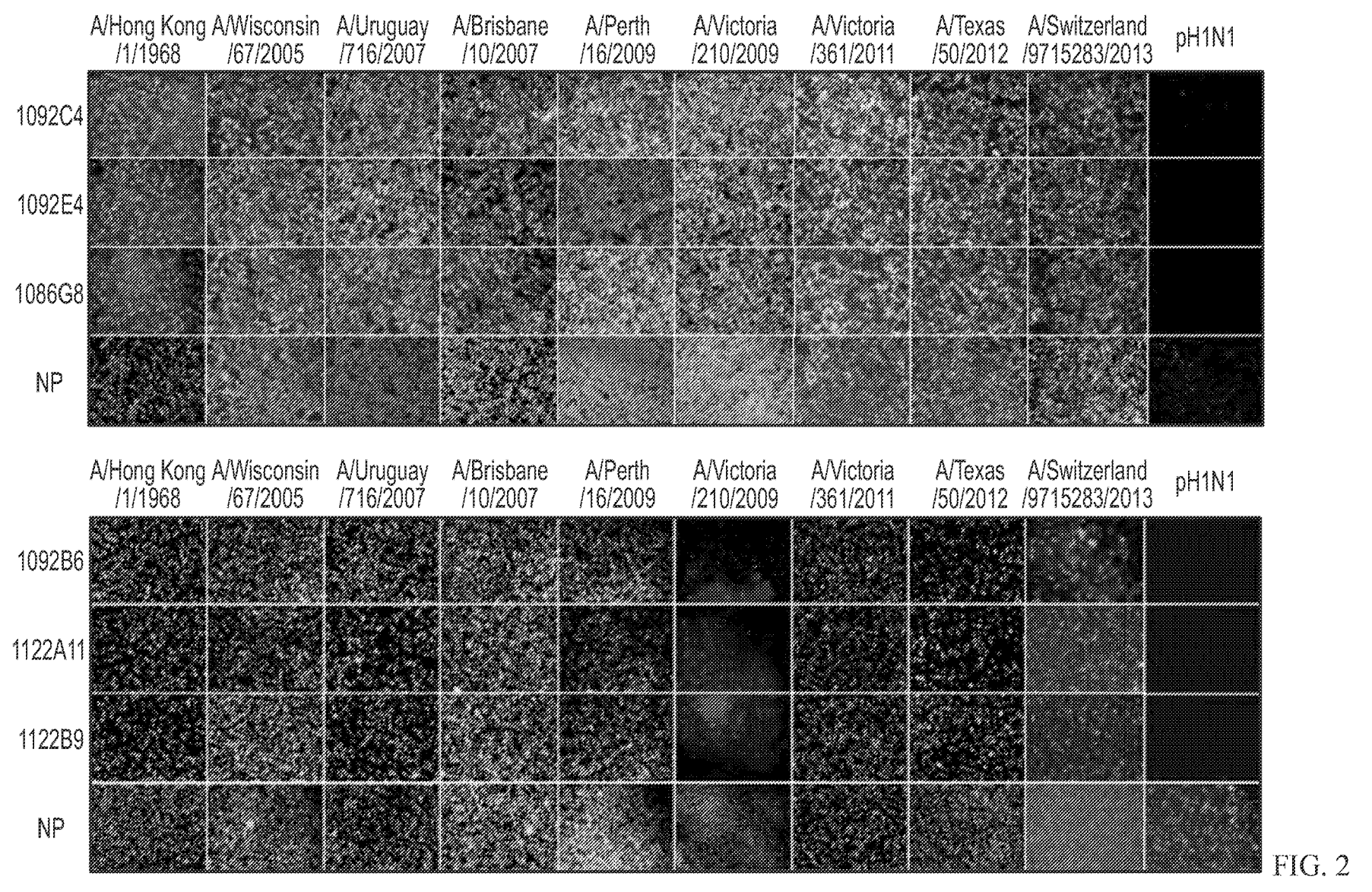

The five hmAbs were characterized by ELISA for binding to various HA and NA proteins (FIG. 1). 1092C4, 1092E4, and 1086G8 hmAbs have broad reactivity against H3 proteins and the H7 protein. They have minimal reactivity against H1 protein. 1122A11 and 1122B9 have broad reactivity against N2 proteins with no reactivity against N1 protein. The hmAbs recognize cells infected with a wide range of H3N2 influenza viruses (FIG. 2). The hmAbs were tested for their ability to neutralize a wide range of H3N2 influenza viruses (Table 2).

Example 3 In Vivo Activity of hmAbs

To evaluate the protective activity of the H3 and N2 hmAbs, mice received 20 mg/kg of the indicated hmAb prior to a lethal intranasal challenge dose (10 MLD50) of H3N2 X31 influenza virus. All mice treated with PBS or isotype control hmAb had severe weight loss and succumb to infection within 7 days (FIGS. 3A and B). All mice treated with 1092E4 hmAb maintained body weight and survived infection. 80% of mice treated with 1086G8, 1092B6, or 1122A11 survived infection and maintained their body weight. Consistent with increased survival, mice treated with the H3 or N2 hmAbs had significant reduction in viral titers in their lungs at two and four days post infection (pi), including the absence of detectable virus at d4 in any of the 1122A11 hmAb mice treated (FIG. 3C).

Figure 4A:
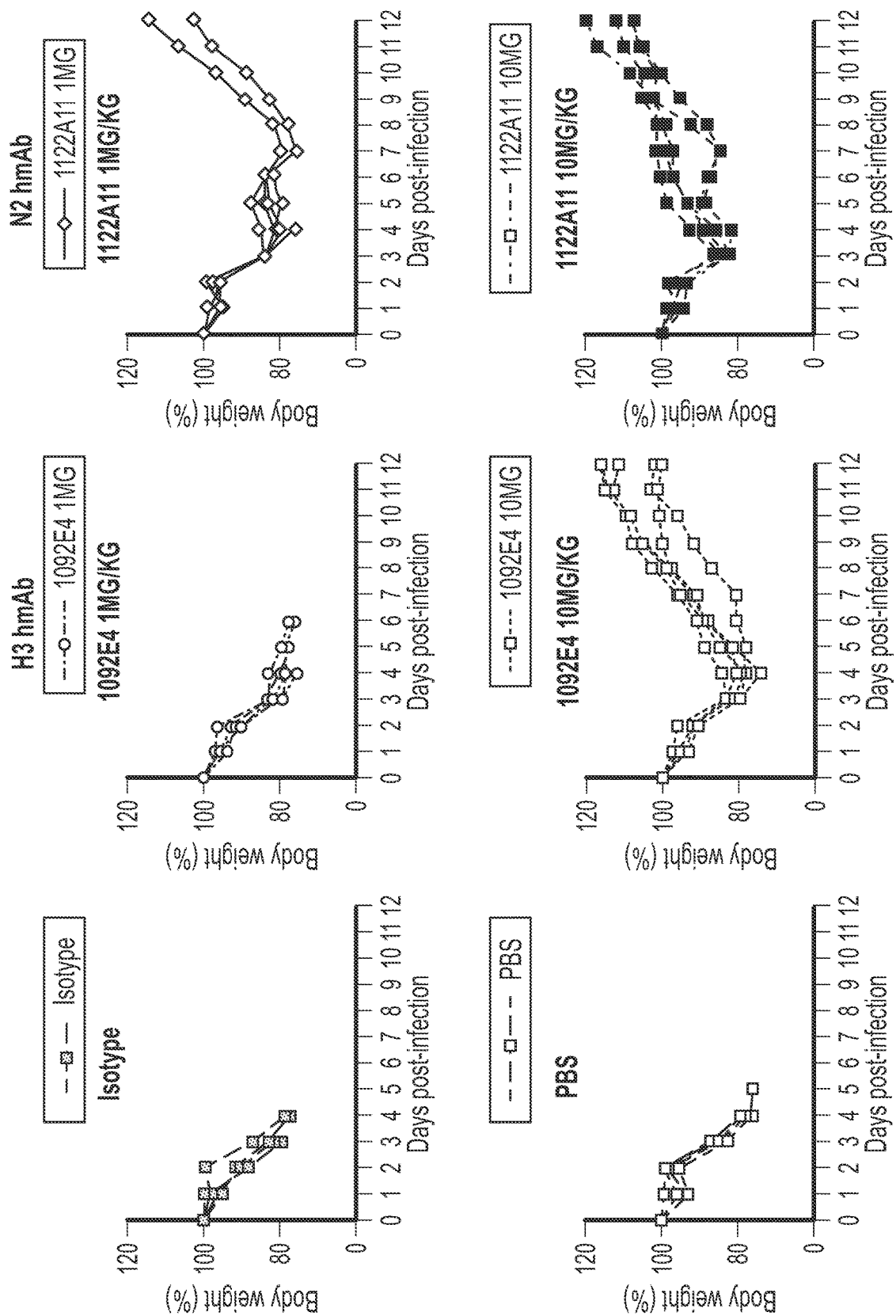
FIGS. 4A, 4B, and 4C are diagrams showing that 1092E4 and 1122A11 hmAbs have potent therapeutic activity in vivo. Female 5-to-7-week old mice were infected with 10 MLD50 of H3N2 X31 virus and 24 hours later treated with 1 mg/kg or 10 mg/kg of indicated hmAb or PBS and monitored daily for body weight loss (A) and survival (B). Mice that lost 25% of their body weight were sacrificed. Data represent the means+/−SDs (n=5). To evaluate viral lung replication (C), mice were sacrificed at 2 (n=3) and 4 (n=3) days post-infection and whole lungs were harvested, and viral titers determined by immunofocus assay (FFU/ml).
Figure 4B:
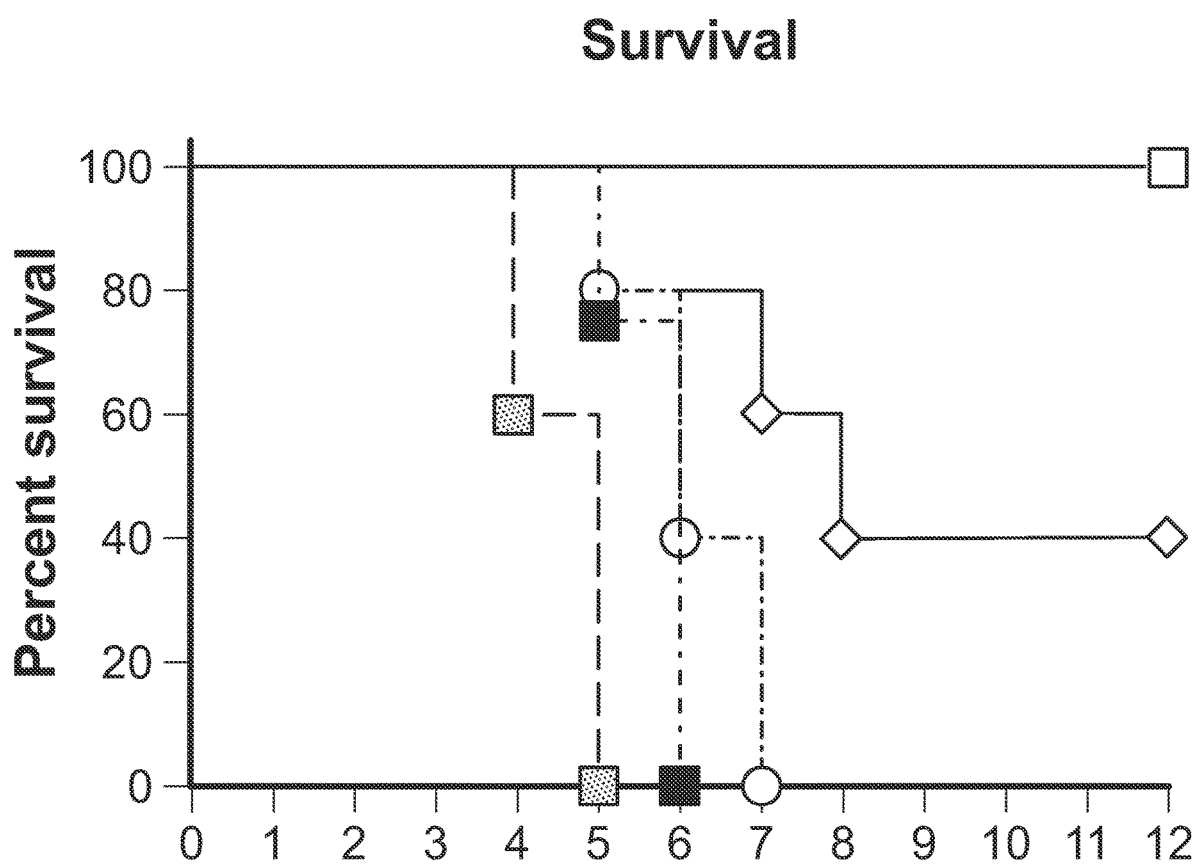
Figure 4C:
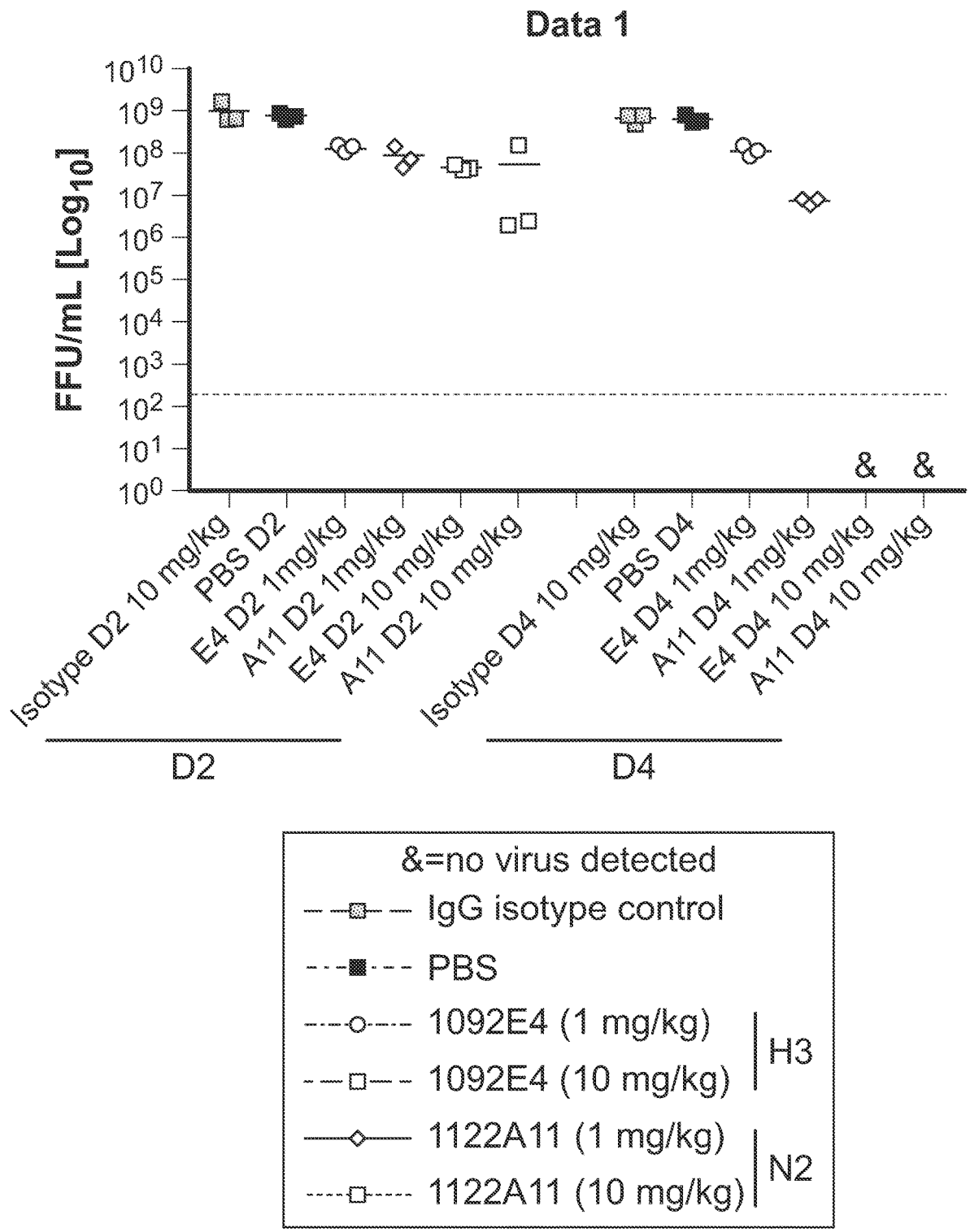

Demonstrating the superior prophylactic activity of 1092E4 H3-specific hmAb and 1122A11 N2-specific hmAb, inventors next assessed the antibodies' therapeutic activity. Mice were challenged with a lethal dose (10 MLD50) of H3N2 X31 influenza virus and then treated 24 h post infection with 1 or 10 mg/kg of hmAb. All mice treated with PBS or isotype control hmAb had severe weight loss and succumbed to infection within 6 days (FIGS. 4A and 4B). All mice treated within 10 mg/kg of 1092E4 or survived the infection and had no detectable virus in their lungs at D4 following infections (FIG. 4C). Treatment with 1 mg/kg of 1122A11 conferred 40% survival. Overall these results demonstrate 1092E4 and 1122A11 have both potent prophylactic and therapeutic activity against H3N2 influenza virus in vivo.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the scope of the invention, and all such variations are intended to be included within the scope of the following claims. All references cited herein are incorporated by reference in their entireties.

TABLE 1

In vitro neutralizing activity of hmAbs.

| hmAbs NT50(ug/ml) | A/HK/ 1/1968 | A/ Wisconsin/ 67/2005 | A/ Uruguay/ 716/2007 | A/ Brisbane/ 10/2007 | A/ Perth/ 16/2009 | A/ Victoria/ 210/2009 | A/ Victoria/ 361/2011 | A/ Texas/ 50/2012 | A/ Switzerland/ 9715283/2013 | A/ Wyoming/ 3/2003 |
|---|---|---|---|---|---|---|---|---|---|---|
| 1092C4 (H3) | 6.25 | 1.60 | 0.20 | 0.10 | 3.13 | 6.25 | 0.10 | 6.25 | 0.78 | 1.60 |
| 1092E4 (H3) | 6.25 | 0.20 | 0.10 | 0.10 | 3.13 | 6.25 | 0.10 | 6.25 | 6.25 | 3.13 |
| 1086G8 (H3) | 1.60 | 3.13 | 0.40 | 0.40 | 6.25 | 12.50 | 0.20 | 6.25 | 12.50 | 0.78 |
| 1092B6 (N2) | 6.25 | 50.00 | 25.00 | 3.13 | 6.25 | 3.13 | 25.00 | 6.25 | 50.00 | 0.40 |
| 1122A11(N2) | 3.13 | 25.00 | 0.20 | 6.25 | 0.20 | 25.00 | 1.60 | 3.13 | 25.00 | 6.25 |

What is claimed is:

1. An isolated antibody or antigen-binding fragment thereof that specifically binds to a hemagglutinin (HA) of influenza virus, comprising:
   (i) a heavy chain variable region that comprises HCDR1, HCDR2, and HCDR3 comprising the respective sequences of a HCDR set selected from the group consisting of SEQ ID NOs: 1-3, SEQ ID NOs: 7-9, and SEQ ID NOs: 7, 8, and 12, and
   (ii) a light chain variable region that comprises LCDR1, LCDR2 and LCDR3 comprising the respective sequences of a LCDR set selected from the group consisting of SEQ ID NOs: 4-6 and SEQ ID NOs: 10, 5, and 11.

2. The isolated antibody or the antigen-binding fragment thereof of claim 1, wherein the heavy chain variable region comprises a sequence selected from the group consisting of SEQ ID NOs: 26, 30 and 34, and the light chain variable region comprises a sequence selected from the group consisting of SEQ ID NOs: 28, 32, and 36.

3. The isolated antibody or the antigen-binding fragment thereof of claim 1, wherein the heavy chain variable region comprises the sequences of SEQ ID NOs: 1-3, and the light chain variable region comprises the sequences of SEQ ID NOs: 4-6.

4. The isolated antibody or the antigen-binding fragment thereof of claim 1, wherein the heavy chain variable region comprises the sequences of SEQ ID NOs: 7, 8, and 9, and the light chain variable region comprises the sequences of SEQ ID NOs: 10, 5, and 11.

5. The isolated antibody or the antigen-binding fragment thereof of claim 1, wherein the heavy chain variable region comprises the sequences of SEQ ID NOs: 7, 8, and 12, and the light chain variable region comprises the sequences of SEQ ID NOs: 10, 5, and 11.

6. An isolated antibody or antigen-binding fragment thereof that specifically binds to a neuraminidase (NA) of influenza virus, comprising:
   (i) a heavy chain variable region that comprises HCDR1, HCDR2, and HCDR3 comprising the respective sequences of a HCDR set selected from the group consisting of SEQ ID NOs: 13-15 and SEQ ID NOs: 19-21, and
   (ii) a light chain variable region that comprises LCDR1, LCDR2 and LCDR3 comprising the respective sequences of a LCDR set selected from the group consisting of SEQ ID NOs: 16-18, and SEQ ID NOs: 22-24.

7. The isolated antibody or the antigen-binding fragment thereof of claim 6, wherein the heavy chain variable region comprises a sequence selected from the group consisting of SEQ ID NOs: 38 and 42, and the light chain variable region comprises a sequence selected from the group consisting of SEQ ID NOs: 40 and 44.

8. The isolated antibody or the antigen-binding fragment thereof of claim 6, wherein the heavy chain variable region comprises the sequences of SEQ ID NOs: 13-15, and the light chain variable region comprises the sequences of SEQ ID NOs: 16-18.

9. The isolated antibody or the antigen-binding fragment thereof of claim 6, wherein the heavy chain variable region comprises the sequences of SEQ ID NOs: 19-21, and the light chain variable region comprises the sequences of SEQ ID NOs: 22-24.

10. The isolated antibody or the antigen-binding fragment thereof of claim 1, further comprising a variant Fc constant region.

11. The isolated antibody or the antigen-binding fragment thereof of claim 1, wherein the antibody is a chimeric antibody, a humanized antibody, or a human antibody.

12. The isolated antibody or the antigen-binding fragment thereof of claim 1, wherein the antibody or fragment is conjugated to a therapeutic agent, a polymer, a detectable label, or an enzyme.

13. The isolated antibody or the antigen-binding fragment thereof of claim 12, wherein the polymer is polyethylene glycol (PEG).

14. The isolated antibody or the antigen-binding fragment thereof of claim 12, wherein the therapeutic agent is cytotoxic agent.

15. An isolated nucleic acid encoding a CDR, a heavy light chain variable region, or a light chain variable region of the antibody, or antigen-binding portion thereof, of claim 1.

16. An expression vector comprising the nucleic acid of claim 15.

17. A cultured host cell comprising the nucleic acid of claim 15 or an expression vector comprising the nucleic acid.

18. A method of preparing an antibody, or antigen-binding portion thereof, comprising:
   obtaining a cultured host cell comprising a vector comprising a nucleic acid sequence encoding a CDR, a heavy chain variable region, or a light chain variable region of the antibody or antigen binding portion thereof of claim 1;

culturing the cell in a medium under conditions permitting expression of a polypeptide encoded by the vector and assembling of an antibody or fragment thereof, and purifying the antibody or fragment from the cultured cell or the medium of the cell.

19. A pharmaceutical composition comprising the antibody or the antigen-binding fragment thereof of claim 1 and a pharmaceutically acceptable carrier.

20. A method of treating an influenza virus infection or neutralizing influenza virus comprising administering to a subject in need thereof a therapeutically effective amount of the antibody or the antigen-binding fragment thereof of claim 1 or a therapeutically effective amount of a pharmaceutical composition comprising the antibody or the antigen-binding fragment thereof and a pharmaceutically acceptable carrier.

21. The method of claim 20, further comprising administering to the subject a therapeutically effective amount of a second antibody or an antigen-binding fragment thereof.

* * * * *

SEQUENCE LISTING

<160> NUMBER OF SEQ ID NOS: 44

<210> SEQ ID NO 1
<211> LENGTH: 8
<212> TYPE: PRT
<213> ORGANISM: Artificial
<220> FEATURE:
<223> OTHER INFORMATION: Synthetic

<400> SEQUENCE: 1

Gly Phe Thr Phe Ala Ser Asp Ala
1               5

<210> SEQ ID NO 2
<211> LENGTH: 8
<212> TYPE: PRT
<213> ORGANISM: Artificial
<220> FEATURE:
<223> OTHER INFORMATION: Synthetic

<400> SEQUENCE: 2

Ile Ser Gly Asn Gly Gly Ile Thr
1               5

<210> SEQ ID NO 3
<211> LENGTH: 24
<212> TYPE: PRT
<213> ORGANISM: Artificial
<220> FEATURE:
<223> OTHER INFORMATION: Synthetic

<400> SEQUENCE: 3

Ala Lys Gly Val Ala Pro Ser His Phe Asn Leu Leu Thr Gly Tyr Tyr
1               5                   10                  15

Ala Gly His Tyr Tyr Phe Asp Phe
            20

<210> SEQ ID NO 4
<211> LENGTH: 6
<212> TYPE: PRT
<213> ORGANISM: Artificial
<220> FEATURE:
<223> OTHER INFORMATION: Synthetic

<400> SEQUENCE: 4

Gln Ser Val Arg His Asn
1               5

<210> SEQ ID NO 5
<211> LENGTH: 3
<212> TYPE: PRT
<213> ORGANISM: Artificial
<220> FEATURE:
<223> OTHER INFORMATION: Synthetic

<400> SEQUENCE: 5

Gly Ala Ser
1

<210> SEQ ID NO 6
<211> LENGTH: 10
<212> TYPE: PRT
<213> ORGANISM: Artificial
<220> FEATURE:
<223> OTHER INFORMATION: Synthetic

<400> SEQUENCE: 6

Gln Gln Tyr Asn His Trp Pro Pro Tyr Thr
1               5                   10

<210> SEQ ID NO 7
<211> LENGTH: 8
<212> TYPE: PRT
<213> ORGANISM: Artificial
<220> FEATURE:
<223> OTHER INFORMATION: Synthetic

<400> SEQUENCE: 7

Gly Tyr Ser Phe Thr Arg Tyr Gly
1               5

<210> SEQ ID NO 8
<211> LENGTH: 8
<212> TYPE: PRT
<213> ORGANISM: Artificial
<220> FEATURE:
<223> OTHER INFORMATION: Synthetic

<400> SEQUENCE: 8

Ile Ser Ala Tyr Thr Gly Asn Thr
1               5

<210> SEQ ID NO 9
<211> LENGTH: 20
<212> TYPE: PRT
<213> ORGANISM: Artificial
<220> FEATURE:
<223> OTHER INFORMATION: Synthetic

<400> SEQUENCE: 9

Ala Arg Asp Leu Pro Gln Gly Val Val Ile Leu Gly Ser Tyr Tyr Tyr
1               5                   10                  15

Gly Met Asp Val
            20

<210> SEQ ID NO 10
<211> LENGTH: 7
<212> TYPE: PRT
<213> ORGANISM: Artificial
<220> FEATURE:
<223> OTHER INFORMATION: Synthetic

<400> SEQUENCE: 10

Gln Ser Val Thr Ser Arg Tyr
1               5

<210> SEQ ID NO 11
<211> LENGTH: 8
<212> TYPE: PRT
<213> ORGANISM: Artificial
<220> FEATURE:
<223> OTHER INFORMATION: Synthetic

<400> SEQUENCE: 11

Gln Gln Ser Gly Ser Pro Arg Thr
1               5

<210> SEQ ID NO 12
<211> LENGTH: 20
<212> TYPE: PRT
<213> ORGANISM: Artificial
<220> FEATURE:
<223> OTHER INFORMATION: Synthetic

```
<400> SEQUENCE: 12

Ala Arg Asp His Pro Gln Gly Val Val Ile Leu Gly Ser Tyr Tyr Tyr
1               5                   10                  15

Gly Met Asp Val
            20

<210> SEQ ID NO 13
<211> LENGTH: 8
<212> TYPE: PRT
<213> ORGANISM: Artificial
<220> FEATURE:
<223> OTHER INFORMATION: Synthetic

<400> SEQUENCE: 13

Gly Tyr Ser Phe Thr Ser Gln Ser
1               5

<210> SEQ ID NO 14
<211> LENGTH: 8
<212> TYPE: PRT
<213> ORGANISM: Artificial
<220> FEATURE:
<223> OTHER INFORMATION: Synthetic

<400> SEQUENCE: 14

Ile Asn Pro Ser Gly Gly Ile Thr
1               5

<210> SEQ ID NO 15
<211> LENGTH: 22
<212> TYPE: PRT
<213> ORGANISM: Artificial
<220> FEATURE:
<223> OTHER INFORMATION: Synthetic

<400> SEQUENCE: 15

Val Arg Asp Leu Ser His Tyr Asn Glu Val Gly His Asp Arg Ala Tyr
1               5                   10                  15

Tyr Tyr Gly Met Asp Ile
            20

<210> SEQ ID NO 16
<211> LENGTH: 6
<212> TYPE: PRT
<213> ORGANISM: Artificial
<220> FEATURE:
<223> OTHER INFORMATION: Synthetic

<400> SEQUENCE: 16

Lys Leu Gly Lys Lys Tyr
1               5

<210> SEQ ID NO 17
<211> LENGTH: 3
<212> TYPE: PRT
<213> ORGANISM: Artificial
<220> FEATURE:
<223> OTHER INFORMATION: Synthetic

<400> SEQUENCE: 17

Gln Asp Asn
1

<210> SEQ ID NO 18
```

```
<211> LENGTH: 9
<212> TYPE: PRT
<213> ORGANISM: Artificial
<220> FEATURE:
<223> OTHER INFORMATION: Synthetic

<400> SEQUENCE: 18

Gln Ala Trp Asp Ser Ser Ala Val Val
1               5

<210> SEQ ID NO 19
<211> LENGTH: 8
<212> TYPE: PRT
<213> ORGANISM: Artificial
<220> FEATURE:
<223> OTHER INFORMATION: Synthetic

<400> SEQUENCE: 19

Gly Phe Thr Phe Ser Gly Tyr Ala
1               5

<210> SEQ ID NO 20
<211> LENGTH: 8
<212> TYPE: PRT
<213> ORGANISM: Artificial
<220> FEATURE:
<223> OTHER INFORMATION: Synthetic

<400> SEQUENCE: 20

Ile Ile Gly Ser Gly Gly Ser Thr
1               5

<210> SEQ ID NO 21
<211> LENGTH: 14
<212> TYPE: PRT
<213> ORGANISM: Artificial
<220> FEATURE:
<223> OTHER INFORMATION: Synthetic

<400> SEQUENCE: 21

Ala Lys His Thr Lys Ser His Tyr Tyr Ser Gly Met Gly Val
1               5                   10

<210> SEQ ID NO 22
<211> LENGTH: 6
<212> TYPE: PRT
<213> ORGANISM: Artificial
<220> FEATURE:
<223> OTHER INFORMATION: Synthetic

<400> SEQUENCE: 22

Gln Asp Ile Ser Asn Tyr
1               5

<210> SEQ ID NO 23
<211> LENGTH: 3
<212> TYPE: PRT
<213> ORGANISM: Artificial
<220> FEATURE:
<223> OTHER INFORMATION: Synthetic

<400> SEQUENCE: 23

Asp Ala Ala
1

<210> SEQ ID NO 24
<211> LENGTH: 9
```

<212> TYPE: PRT
<213> ORGANISM: Artificial
<220> FEATURE:
<223> OTHER INFORMATION: Synthetic

<400> SEQUENCE: 24

Gln Gln Tyr Asp Asn Leu Pro Leu Thr
1               5

<210> SEQ ID NO 25
<211> LENGTH: 394
<212> TYPE: DNA
<213> ORGANISM: Artificial
<220> FEATURE:
<223> OTHER INFORMATION: Synthetic

<400> SEQUENCE: 25
gaggtgcagc tgttggagtc tgggggaggc ttggttcagc ctggggggtc cctgagactc      60
tcctgtacag cctctggatt cacgtttgcc agcgatgcca tgaactgggt ccgccaggct     120
ccagggaagg gcctggagtg gtctcagct attagtggta atggtggtat cacatacttc     180
gcagactccg tgaagggccg gttcaccatc tcccgagaca attccaagga cacgctctat     240
ctgcaaatgg acagcctgag gccgaggac acggccgtat attactgtgc aaaggggtc      300 gcaccctcac atttcaatct ttgactggt tattatgcgg acactacta ctttgacttc      360 tggggccagg gaaccctggt caccgtctcc tcag                                394

<210> SEQ ID NO 26
<211> LENGTH: 131
<212> TYPE: PRT
<213> ORGANISM: Artificial
<220> FEATURE:
<223> OTHER INFORMATION: Synthetic

<400> SEQUENCE: 26

Glu Val Gln Leu Leu Glu Ser Gly Gly Gly Leu Val Gln Pro Gly Gly
1               5                   10                  15

Ser Leu Arg Leu Ser Cys Thr Ala Ser Gly Phe Thr Phe Ala Ser Asp
            20                  25                  30

Ala Met Asn Trp Val Arg Gln Ala Pro Gly Lys Gly Leu Glu Trp Val
        35                  40                  45

Ser Ala Ile Ser Gly Asn Gly Gly Ile Thr Tyr Phe Ala Asp Ser Val
    50                  55                  60

Lys Gly Arg Phe Thr Ile Ser Arg Asp Asn Ser Lys Asp Thr Leu Tyr
65                  70                  75                  80

Leu Gln Met Asp Ser Leu Arg Ala Glu Asp Thr Ala Val Tyr Tyr Cys
                85                  90                  95

Ala Lys Gly Val Ala Pro Ser His Phe Asn Leu Leu Thr Gly Tyr Tyr
            100                 105                 110

Ala Gly His Tyr Tyr Phe Asp Phe Trp Gly Gln Gly Thr Leu Val Thr
        115                 120                 125

Val Ser Ser
    130

<210> SEQ ID NO 27
<211> LENGTH: 325
<212> TYPE: DNA
<213> ORGANISM: Artificial
<220> FEATURE:
<223> OTHER INFORMATION: Synthetic

<400> SEQUENCE: 27

```
gaaatagtga tgacgcagtc tccagccacc ctgtctgtgt ctccagggga aagagccacc      60
ctctcctgca gggccagtca gagtgttcgt cacaacttag cctggtacca gcacaaacct    120
ggccagcctc ccaggctcct catctatggt gcatccacta gggccgctag tgtcccagcc    180
aggttcagtg gcagtgggtc tgggacagac ttcactctca ccatcagcag cctgcagtct    240
gaagattttg cagtttatta ctgtcagcag tataatcact ggcctccgta cacttttggc    300
caggggacca agctggagat caaac                                          325
```

<210> SEQ ID NO 28
<211> LENGTH: 108
<212> TYPE: PRT
<213> ORGANISM: Artificial
<220> FEATURE:
<223> OTHER INFORMATION: Synthetic

<400> SEQUENCE: 28

```
Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Arg His Asn
            20                  25                  30

Leu Ala Trp Tyr Gln His Lys Pro Gly Gln Pro Pro Arg Leu Leu Ile
        35                  40                  45

Tyr Gly Ala Ser Thr Arg Ala Ala Ser Val Pro Ala Arg Phe Ser Gly
    50                  55                  60

Ser Gly Ser Gly Thr Asp Phe Thr Leu Thr Ile Ser Ser Leu Gln Ser
65                  70                  75                  80

Glu Asp Phe Ala Val Tyr Tyr Cys Gln Gln Tyr Asn His Trp Pro Pro
                85                  90                  95

Tyr Thr Phe Gly Gln Gly Thr Lys Leu Glu Ile Lys
            100                 105
```

<210> SEQ ID NO 29
<211> LENGTH: 381
<212> TYPE: DNA
<213> ORGANISM: Artificial
<220> FEATURE:
<223> OTHER INFORMATION: Synthetic

<400> SEQUENCE: 29

```
gaggtgcagc tggtgcagtc tggggctgag gtgaagaagc ctggggcctc agtgaaggtc      60
tcctgcaagg cctctggtta cagttttacc agatatggta ttagctgggt gcgacaggcc    120
cctggacaag gccttgagtg gatgggatgg atcagcgctt acactggtaa cacagactat    180
gcacagaagt tcagggcag aatcaccatg accacagaca catccacgag cacagcctac    240
atggagctga ggagcctgag atctgacgac acggccgttt attactgtgc gagagatctc    300
cctcagggag tagttatatt aggctcctat tactacggta tggacgtctg gggccaaggg    360
aacacggtca ccgtctcctc a                                              381
```

<210> SEQ ID NO 30
<211> LENGTH: 127
<212> TYPE: PRT
<213> ORGANISM: Artificial
<220> FEATURE:
<223> OTHER INFORMATION: Synthetic

<400> SEQUENCE: 30

Glu Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Arg Tyr
            20                  25                  30

Gly Ile Ser Trp Val Arg Gln Ala Pro Gly Gln Gly Leu Glu Trp Met
        35                  40                  45

Gly Trp Ile Ser Ala Tyr Thr Gly Asn Thr Asp Tyr Ala Gln Lys Phe
    50                  55                  60

Gln Gly Arg Ile Thr Met Thr Thr Asp Thr Ser Thr Ser Thr Ala Tyr
65                  70                  75                  80

Met Glu Leu Arg Ser Leu Arg Ser Asp Asp Thr Ala Val Tyr Tyr Cys
                85                  90                  95

Ala Arg Asp Leu Pro Gln Gly Val Val Ile Leu Gly Ser Tyr Tyr Tyr
            100                 105                 110

Gly Met Asp Val Trp Gly Gln Gly Asn Thr Val Thr Val Ser Ser
        115                 120                 125

<210> SEQ ID NO 31
<211> LENGTH: 322
<212> TYPE: DNA
<213> ORGANISM: Artificial
<220> FEATURE:
<223> OTHER INFORMATION: Synthetic

<400> SEQUENCE: 31

```
gaaattgtgt tgacgcagtc tccaggcacc ctgtctttgt ctccagggga aagagccacc    60
ctctcctgca gggccagtca gagtgttacc agtaggtact tagcctggta ccagcaaaaa   120
cttggccagg ctcccaggct cctcatctat ggtgcatcca gcagggccac tggcatccca   180
gacaggttca gtggcagtgg gtctgggaca gacttcactc tcaccatcag cagtctggag   240
cctgaagatc ttgcagttta ttactgtcag cagtctggta gcccacggac gttcggccaa   300
gggaccaagg tggaaatcaa ac                                            322
```

<210> SEQ ID NO 32
<211> LENGTH: 107
<212> TYPE: PRT
<213> ORGANISM: Artificial
<220> FEATURE:
<223> OTHER INFORMATION: Synthetic

<400> SEQUENCE: 32

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Thr Ser Arg
            20                  25                  30

Tyr Leu Ala Trp Tyr Gln Gln Lys Leu Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Ser Leu Glu
65                  70                  75                  80

Pro Glu Asp Leu Ala Val Tyr Tyr Cys Gln Gln Ser Gly Ser Pro Arg
                85                  90                  95

Thr Phe Gly Gln Gly Thr Lys Val Glu Ile Lys
            100                 105

<210> SEQ ID NO 33

<211> LENGTH: 381
<212> TYPE: DNA
<213> ORGANISM: Artificial
<220> FEATURE:
<223> OTHER INFORMATION: Synthetic

<400> SEQUENCE: 33

```
caggtgcagc tggtgcagtc tggagctgag gtgaagaagc ctggggcctc agtgaaggtc      60
tcctgcaagg cctctggtta cagctttacc agatatggta taagctgggt gcgacaggcc     120
cctggacaag gccttgagtg gatgggatgg atcagcgctt acactggtaa cacagactat     180
gcacagaaat tcagggcag aatcaccatg accacagaca catccacgag cacagtctac      240
atggagctga ggagcctaag atctgacgac acggccgtgt attactgtgc gagagatcac     300
cctcagggag tagttatatt aggctcctat tactacggta tggacgtctg ggccaaggg      360
aacacggtca ccgtctcctc a                                               381
```

<210> SEQ ID NO 34
<211> LENGTH: 127
<212> TYPE: PRT
<213> ORGANISM: Artificial
<220> FEATURE:
<223> OTHER INFORMATION: Synthetic

<400> SEQUENCE: 34

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Arg Tyr
            20                  25                  30

Gly Ile Ser Trp Val Arg Gln Ala Pro Gly Gln Gly Leu Glu Trp Met
        35                  40                  45

Gly Trp Ile Ser Ala Tyr Thr Gly Asn Thr Asp Tyr Ala Gln Lys Phe
    50                  55                  60

Gln Gly Arg Ile Thr Met Thr Thr Asp Thr Ser Thr Ser Thr Val Tyr
65                  70                  75                  80

Met Glu Leu Arg Ser Leu Arg Ser Asp Asp Thr Ala Val Tyr Tyr Cys
                85                  90                  95

Ala Arg Asp His Pro Gln Gly Val Val Ile Leu Gly Ser Tyr Tyr Tyr
            100                 105                 110

Gly Met Asp Val Trp Gly Gln Gly Asn Thr Val Thr Val Ser Ser
        115                 120                 125
```

<210> SEQ ID NO 35
<211> LENGTH: 322
<212> TYPE: DNA
<213> ORGANISM: Artificial
<220> FEATURE:
<223> OTHER INFORMATION: Synthetic

<400> SEQUENCE: 35

```
gaaattgtgt tgacgcagtc tccgggcacc ctgtctttgt ctccagggga agagccacc       60
ctctcctgca gggccagtca gagtgttacc agtaggtact tagcctggta ccagcaaaaa     120
cttggccagg ctcccaggct cctcatctat ggtgcatcca gcagggccac tggcatccca     180
gacaggttca gtggcagtgg gtctgggaca gacttcactc tcaccatcag cagtctggag     240
cctgaagatt ttgcagtgta ttactgtcag cagtctggta gcccacggac gttcggccaa     300
gggaccaagg tggaaatcaa ac                                              322
```

```
<210> SEQ ID NO 36
<211> LENGTH: 107
<212> TYPE: PRT
<213> ORGANISM: Artificial
<220> FEATURE:
<223> OTHER INFORMATION: Synthetic

<400> SEQUENCE: 36

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Thr Ser Arg
            20                  25                  30

Tyr Leu Ala Trp Tyr Gln Gln Lys Leu Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Ser Leu Glu
65                  70                  75                  80

Pro Glu Asp Phe Ala Val Tyr Tyr Cys Gln Gln Ser Gly Ser Pro Arg
                85                  90                  95

Thr Phe Gly Gln Gly Thr Lys Val Glu Ile Lys
            100                 105

<210> SEQ ID NO 37
<211> LENGTH: 387
<212> TYPE: DNA
<213> ORGANISM: Artificial
<220> FEATURE:
<223> OTHER INFORMATION: Synthetic

<400> SEQUENCE: 37
caggtgcagc tggtgcagtc tggggctgag gtgagcaagc ctggggcctc agtgaaggtc      60
tcctgcaagg catctggata cagcttcacc agccagtctc taggctgggt gcggcaggcc     120
cctggacaag gcttgagtg gatgggaata atcaaccctag tggtggtat cacaaactac      180 gcacacaagt tccagggcag agtcaccatg accagggaca cgtccacgag cacggtctac     240
atggagctga gcagcctgag atctgaggac acggccctgt attactgtgt gagagatttg     300
agtcattaca tgaagtgggg acatgacagg gcctactact acggtatgga catctggggc     360
caagggacca cggtcaccgt ctcctca                                         387

<210> SEQ ID NO 38
<211> LENGTH: 129
<212> TYPE: PRT
<213> ORGANISM: Artificial
<220> FEATURE:
<223> OTHER INFORMATION: Synthetic

<400> SEQUENCE: 38

Gln Val Gln Leu Val Gln Ser Gly Ala Glu Val Ser Lys Pro Gly Ala
1               5                   10                  15

Ser Val Lys Val Ser Cys Lys Ala Ser Gly Tyr Ser Phe Thr Ser Gln
            20                  25                  30

Ser Leu Gly Trp Val Arg Gln Ala Pro Gly Gln Gly Leu Glu Trp Met
        35                  40                  45

Gly Ile Ile Asn Pro Ser Gly Gly Ile Thr Asn Tyr Ala His Lys Phe
    50                  55                  60

Gln Gly Arg Val Thr Met Thr Arg Asp Thr Ser Thr Ser Thr Val Tyr
65                  70                  75                  80
```

```
Met Glu Leu Ser Ser Leu Arg Ser Glu Asp Thr Ala Leu Tyr Tyr Cys
                85                  90                  95

Val Arg Asp Leu Ser His Tyr Asn Glu Val Gly His Arg Ala Tyr
            100                 105                 110

Tyr Tyr Gly Met Asp Ile Trp Gly Gln Gly Thr Thr Val Thr Val Ser
        115                 120                 125

Ser

<210> SEQ ID NO 39
<211> LENGTH: 319
<212> TYPE: DNA
<213> ORGANISM: Artificial
<220> FEATURE:
<223> OTHER INFORMATION: Synthetic

<400> SEQUENCE: 39
tcctatgagc tgattcagcc accctcagtg tccgtgtccc caggacagac agccagcatc      60
acctgttctg gagataaatt ggggaaaaaa tatacttgct ggtatcagca gaagccaggc     120
cagtcccctg tgctggtcat ctatcaggat aacaagcggc cctcagggat ccctgagcgg     180
ttctctggct ccaactctgg gaacacagcc actctgacca tcagcgggac ccaggctatg     240
gatgaggctg actattactg tcaggcgtgg gacagcagcg ctgtggtatt cggcggaggg     300
accaagctga ccgtcctgg                                                 319

<210> SEQ ID NO 40
<211> LENGTH: 106
<212> TYPE: PRT
<213> ORGANISM: Artificial
<220> FEATURE:
<223> OTHER INFORMATION: Synthetic

<400> SEQUENCE: 40

Ser Tyr Glu Leu Ile Gln Pro Pro Ser Val Ser Val Ser Pro Gly Gln
1               5                   10                  15

Thr Ala Ser Ile Thr Cys Ser Gly Asp Lys Leu Gly Lys Lys Tyr Thr
            20                  25                  30

Cys Trp Tyr Gln Gln Lys Pro Gly Gln Ser Pro Val Leu Val Ile Tyr
        35                  40                  45

Gln Asp Asn Lys Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Met
65                  70                  75                  80

Asp Glu Ala Asp Tyr Tyr Cys Gln Ala Trp Asp Ser Ser Ala Val Val
                85                  90                  95

Phe Gly Gly Gly Thr Lys Leu Thr Val Leu
            100                 105

<210> SEQ ID NO 41
<211> LENGTH: 363
<212> TYPE: DNA
<213> ORGANISM: Artificial
<220> FEATURE:
<223> OTHER INFORMATION: Synthetic

<400> SEQUENCE: 41
gaggtgcagc tggtggagtc tgggggaggc ttggtccagc cggggggtc cctgagactc       60 tcctgtgcag cctctggatt caccttagc ggctatgcca tgagctgggt ccgccaggct      120
ccagggaagg ggctggagtg cgtctcaggt attattggta gtggtggaag cacatactcc     180
```

```
gcagactccg tgaagggccg gttcaccatc tccagagaca attccaagaa cacgctggat    240
ctggaaatga acagcctgag agccgaggac acggccgtat attattgtgc gaaacatacc    300
aaatcccact actattccgg aatgggcgtc tggggccaag ggaccacggt caccgtctcc    360
tca                                                                  363
```

<210> SEQ ID NO 42
<211> LENGTH: 121
<212> TYPE: PRT
<213> ORGANISM: Artificial
<220> FEATURE:
<223> OTHER INFORMATION: Synthetic

<400> SEQUENCE: 42

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Gly Tyr
            20                  25                  30

Ala Met Ser Trp Val Arg Gln Ala Pro Gly Lys Gly Leu Glu Cys Val
        35                  40                  45

Ser Gly Ile Ile Gly Ser Gly Ser Thr Tyr Ser Ala Asp Ser Val
    50                  55                  60

Lys Gly Arg Phe Thr Ile Ser Arg Asp Asn Ser Lys Asn Thr Leu Asp
65                  70                  75                  80

Leu Glu Met Asn Ser Leu Arg Ala Glu Asp Thr Ala Val Tyr Tyr Cys
                85                  90                  95

Ala Lys His Thr Lys Ser His Tyr Tyr Ser Gly Met Gly Val Trp Gly
            100                 105                 110

Gln Gly Thr Thr Val Thr Val Ser Ser
        115                 120
```

<210> SEQ ID NO 43
<211> LENGTH: 322
<212> TYPE: DNA
<213> ORGANISM: Artificial
<220> FEATURE:
<223> OTHER INFORMATION: Synthetic

<400> SEQUENCE: 43

```
gacatccaga tgacccagtc tccatcctcc ctgtctgcat ctgtaggaga cagagtcacc     60
atcacttgcc aggcgagtca ggacattagc aactatttaa attggtatca gcagagacca    120
gggaaagccc ctaaactcct gatctacgat gcagccaatt tggaaacagg ggtcccatca    180
aggttcagcg gaagtggatc tgcgacacag tttactttca ccatcagcgg cctgcagcct    240
gaagattttg caacatatta ctgtcaacag tatgataatc tccctctcac tttcggcggc    300
gggaccaagg tggaaatcaa ac                                             322
```

<210> SEQ ID NO 44
<211> LENGTH: 107
<212> TYPE: PRT
<213> ORGANISM: Artificial
<220> FEATURE:
<223> OTHER INFORMATION: Synthetic

<400> SEQUENCE: 44

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
```

```
                       20                  25                  30

Leu Asn Trp Tyr Gln Gln Arg Pro Gly Lys Ala Pro Lys Leu Leu Ile
            35                  40                  45

Tyr Asp Ala Ala Asn Leu Glu Thr Gly Val Pro Ser Arg Phe Ser Gly
        50                  55                  60

Ser Gly Ser Ala Thr Gln Phe Thr Phe Thr Ile Ser Gly Leu Gln Pro
65                  70                  75                  80

Glu Asp Phe Ala Thr Tyr Tyr Cys Gln Gln Tyr Asp Asn Leu Pro Leu
                85                  90                  95

Thr Phe Gly Gly Gly Thr Lys Val Glu Ile Lys
                100                 105
```